(12) United States Patent
Kobayashi

(10) Patent No.: US 10,338,857 B2
(45) Date of Patent: Jul. 2, 2019

(54) INFORMATION PROCESSING APPARATUS, INFORMATION PROCESSING SYSTEM, AND INFORMATION PROCESSING METHOD

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/815,868

(22) Filed: Nov. 17, 2017

(65) Prior Publication Data

US 2018/0143794 A1    May 24, 2018

(30) Foreign Application Priority Data

Nov. 24, 2016  (JP) .................................. 2016-228196
Aug. 10, 2017  (JP) .................................. 2017-156153

(51) Int. Cl.
*G06F 3/12*    (2006.01)
*G06F 9/44*    (2018.01)
*G06K 15/02*   (2006.01)

(52) U.S. Cl.
CPC .......... *G06F 3/1206* (2013.01); *G06F 3/1204* (2013.01); *G06F 3/1205* (2013.01); *G06F 3/1225* (2013.01); *G06F 3/1247* (2013.01); *G06F 3/1248* (2013.01); *G06F 3/1285* (2013.01); *G06F 9/44* (2013.01); *G06F 3/1211* (2013.01)

(58) Field of Classification Search
None
See application file for complete search history.

(56) References Cited

U.S. PATENT DOCUMENTS

| | | |
|---|---|---|
| 8,848,217 B2 | 9/2014 | Kobayashi |
| 8,867,077 B2 | 10/2014 | Kobayashi |
| 8,953,214 B2 | 2/2015 | Kobayashi |
| 9,274,736 B2 | 3/2016 | Kobayashi |
| 9,298,411 B2 | 3/2016 | Kobayashi |
| 9,442,678 B2 | 9/2016 | Kobayashi et al. |
| 9,547,461 B2 | 1/2017 | Kobayashi et al. |

(Continued)

FOREIGN PATENT DOCUMENTS

JP    2012-226582    11/2012

*Primary Examiner* — Beniyam Menberu
(74) *Attorney, Agent, or Firm* — IPUSA, PLLC

(57) ABSTRACT

An information processing apparatus for executing a printer driver that requests an image processing apparatus to perform image processing, the information processing apparatus including a processor, in communication with a memory, executing a process including executing, by a plurality of process executors, a process in response to a request from the printer driver, the process corresponding to at least one extended function to be executed on print data; storing, in a storage area, process information relating to the plurality of process executors; accepting a request for a printing process; acquiring, by the printer driver, the process information from the storage area, upon accepting the request for the printing process; and requesting, by the printer driver, at least one of the plurality of process executors to execute the process on the print data, based on the acquired process information.

17 Claims, 37 Drawing Sheets

(56) References Cited

U.S. PATENT DOCUMENTS

| | | | |
|---|---|---|---|
| 2002/0113989 A1* | 8/2002 | Ferlitsch | G06F 3/1203 358/1.15 |
| 2006/0056693 A1* | 3/2006 | Yamazaki | G06F 9/3814 382/173 |
| 2009/0051954 A1* | 2/2009 | Miyata | G06F 3/1205 358/1.13 |
| 2011/0058199 A1 | 3/2011 | Kobayashi | |
| 2011/0286036 A1 | 11/2011 | Kobayashi | |
| 2012/0086970 A1* | 4/2012 | Takahashi | G06K 15/1859 358/1.13 |
| 2012/0140269 A1 | 6/2012 | Kobayashi | |
| 2012/0307275 A1* | 12/2012 | Tamashima | G06F 3/1205 358/1.13 |
| 2013/0169987 A1* | 7/2013 | Akiyama | G06F 9/44505 358/1.13 |
| 2017/0078520 A1 | 3/2017 | Kobayashi | |

* cited by examiner

FIG.8A

```
{
    "name":"programA",
    "path":"C:¥programA¥Aplugin.dll",
    "action":"modify"
}
```
810
811 — "name"
812 — "path"
813 — "action"

FIG.8B

```
{
    "name":"program1",
    "path":"C:¥ProgramFiles¥program1¥bin¥1program.dll",
    "action":"read"
}
```
820

FIG.8C

```
{
    "name":"programZ",
    "path":"C:¥programZ¥Zplugin.dll",
    "action":"transfer"
}
```
830

FIG.9A

```
[
  {
    "name": "programA",
    "path": "C:¥programA¥Aplugin.dll",
    "action": "modify"
  },
  {
    "name": "programB",
    "path": "C:¥ProgramFiles¥ProgramB¥bin¥Bplugin.dll",
    "action": "modify"
  }
]
```

```
[
  {
    "name":"program1",
    "path":"C:¥program1¥1plugin.dll",
    "action":"read"
  },
  {
    "name":"program2",
    "path":"C:¥ProgramFiles¥Program2¥bin2plugin.dll",
    "action":"read"
  }
]
```

SELECT COOPERATION SOLUTION — 1020

PLEASE SELECT

| NAME | DESCRIPTION | TO COOPERATE — 1021 |
|---|---|---|
| MONITOR DATA | RECORD JOB LOG | ☑ |
| CLOUD TRANSFER | TRANSFER TO DEVICE OTHER THAN PRINTER | ☑ |
| INDIVIDUAL AUTHENTICATION | ADD AUTHENTICATION FUNCTION | ☐ — 1022 |

OK    CANCEL

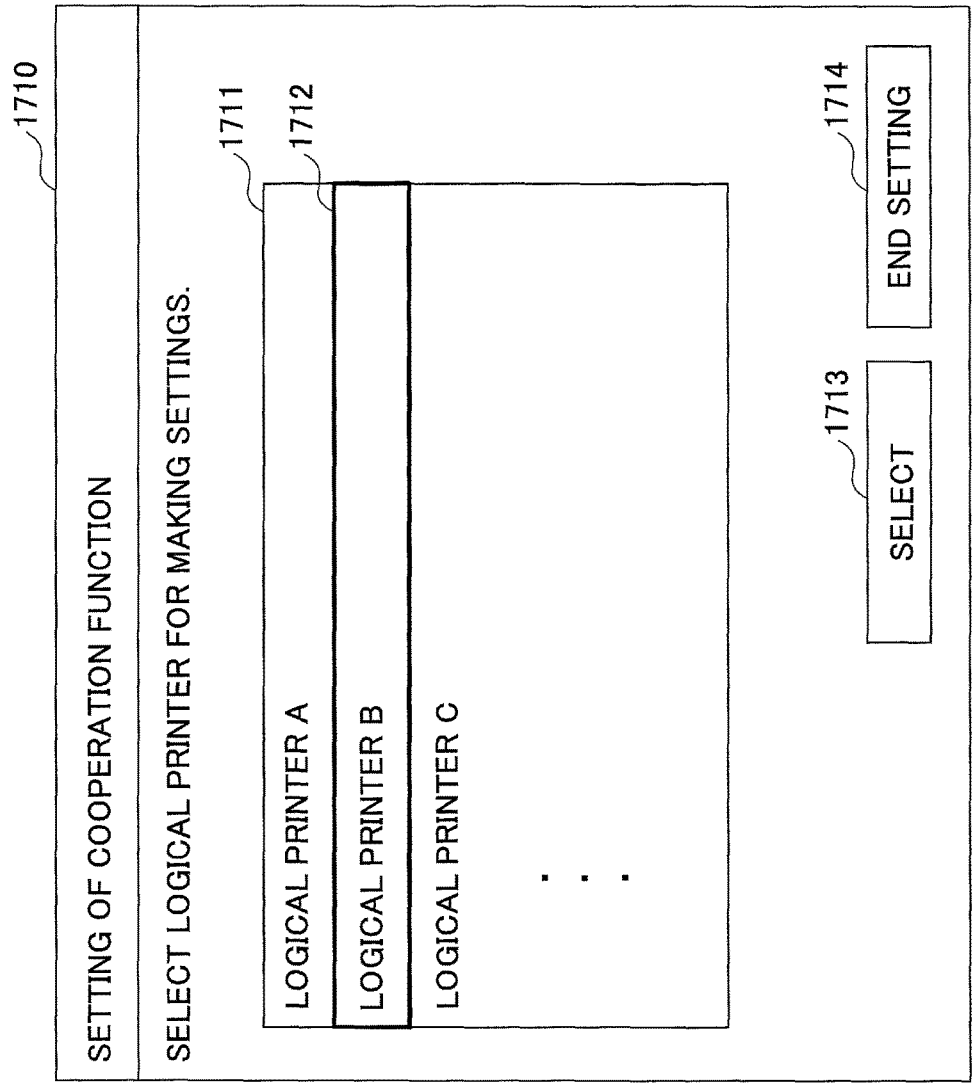

FIG.24

```
                                                            ╔═ 2400
┌─────────────────────────────────────────────────────────────────┐
│ CONFIGURATION OF STANDARD PORT MONITOR                          │
│  ┌──────────┐                                                   │
│  │ SET PORT │                                                   │
│  ├──────────┴──────────────────────────────────────────────┐    │
│  │                                                          │   │
│  │   PORT NAME (P):           ┌──────────────────────────┐ │   │
│  │                            │ XXX Eco Friendly Print UX│ │   │
│  │                            └──────────────────────────┘ │   │
│  │   PRINTER NAME OR          ┌──────────────────────────┐ │   │
│  │   IP ADDRESS (A):          │ 10.60.135.162            │ │   │
│  │                            └──────────────────────────┘ │   │
│  │  ┌─ PROTOCOL ─────────────────────────────────────────┐ │   │
│  │  │    ⦿ Raw (R)           ○ LPR (L)                   │ │   │
│  │  └────────────────────────────────────────────────────┘ │   │
│  │  ┌─ RAW SETTING ──────────────────────────────────────┐ │   │
│  │  │  PORT NUMBER (N):     ┌──────────────────────────┐ │ │   │
│  │  │                       │ 9100                     │ │ │   │
│  │  │                       └──────────────────────────┘ │ │   │
│  │  └────────────────────────────────────────────────────┘ │   │
│  │  ┌─ LPR SETTING ──────────────────────────────────────┐ │   │
│  │  │  QUEUE NAME (Q):      ┌──────────────────────────┐ │ │   │
│  │  │                       │                          │ │ │   │
│  │  │                       └──────────────────────────┘ │ │   │
│  │  │  ☐ ACTIVATE LPR BYTE COUNT (B):                    │ │   │
│  │  └────────────────────────────────────────────────────┘ │   │
│  │  ┌─☐ ACTIVATE SNMP STATUS (S)─────────────────────────┐ │   │
│  │  │  COMMUNITY NAME (C):  ┌──────────────────────────┐ │ │   │
│  │  │                       │ public                   │ │ │   │
│  │  │                       └──────────────────────────┘ │ │   │
│  │  │  SNMP DEVICE INDEX (D): ┌────────────────────────┐ │ │   │
│  │  │                         │ 1                      │ │ │   │
│  │  │                         └────────────────────────┘ │ │   │
│  │  └────────────────────────────────────────────────────┘ │   │
│  │                                  ┌──────┐  ┌──────────┐ │   │
│  │                                  │  OK  │  │  CANCEL  │ │   │
│  │                                  └──────┘  └──────────┘ │   │
│  └─────────────────────────────────────────────────────────┘    │
└─────────────────────────────────────────────────────────────────┘
```

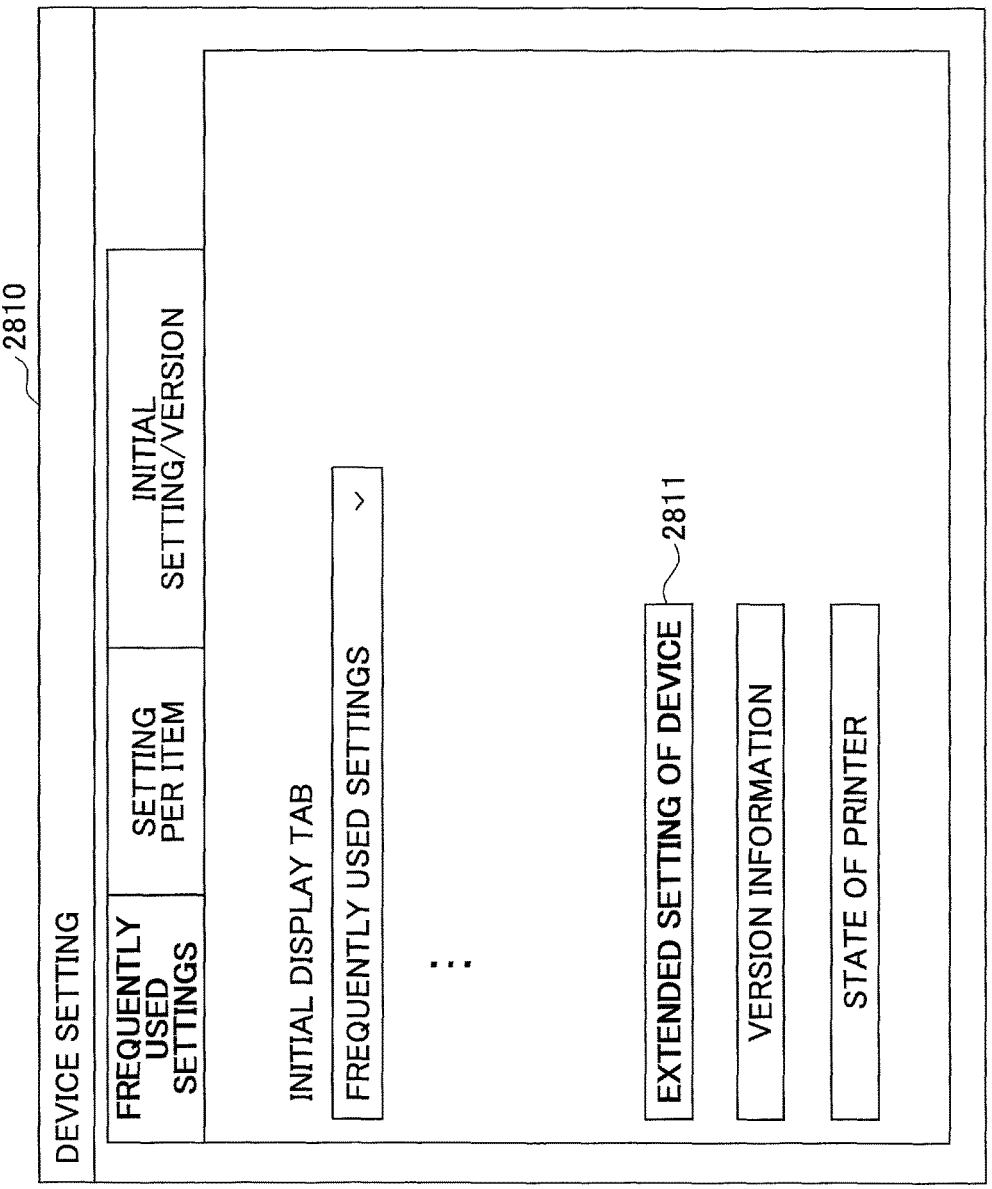

FIG.30A

| SELECT EXTENDED FUNCTION | | |
|---|---|---|
| PLEASE SELECT | | |
| NAME | DESCRIPTION | TO COOPERATE |
| MONITOR DATA | RECORD JOB LOG | ☑ SET |
| CLOUD TRANSFER | TRANSFER TO DEVICE OTHER THAN PRINTER | ☑ SET |
| INDIVIDUAL AUTHENTICATION | ADD AUTHENTICATION FUNCTION | ☐ |

OK    CANCEL 3000, 3001, 3002, 3003

FIG.30B

SET DATA MONITORING — 3010

- PORT NAME: PORT ○○
- PRINTER NAME OR IP ADDRESS: 127.0.0.1

[OK] [CANCEL] [HELP]

FIG.30C

SETTING OF CLOUD TRANSFER — 3020

- TRANSFER SERVER NAME: SERVER ××
- TRANSFER SERVER ADDRESS: 1.2.3.4
- ☑ ENCRYPT

[OK] [CANCEL] [HELP]

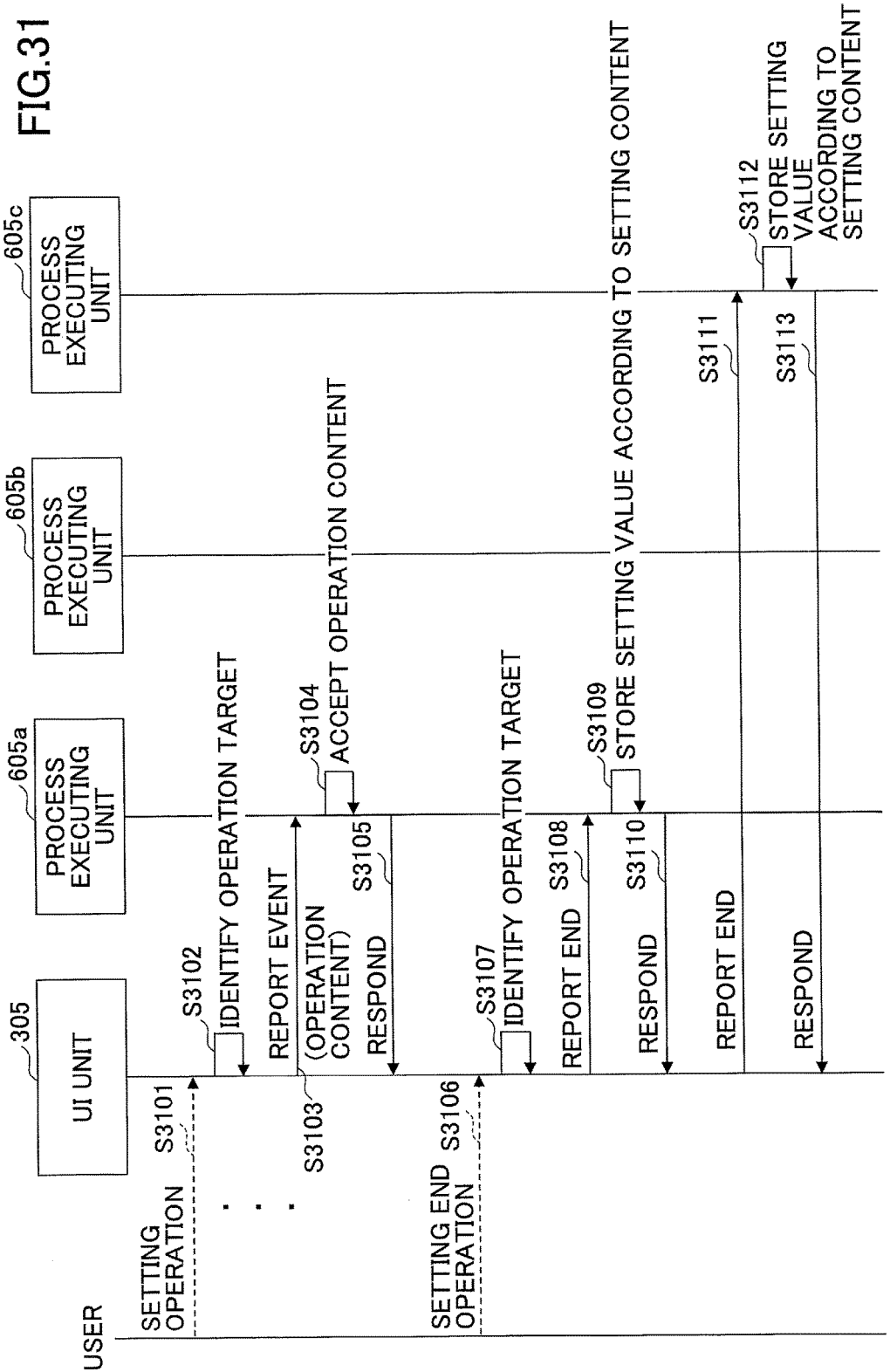

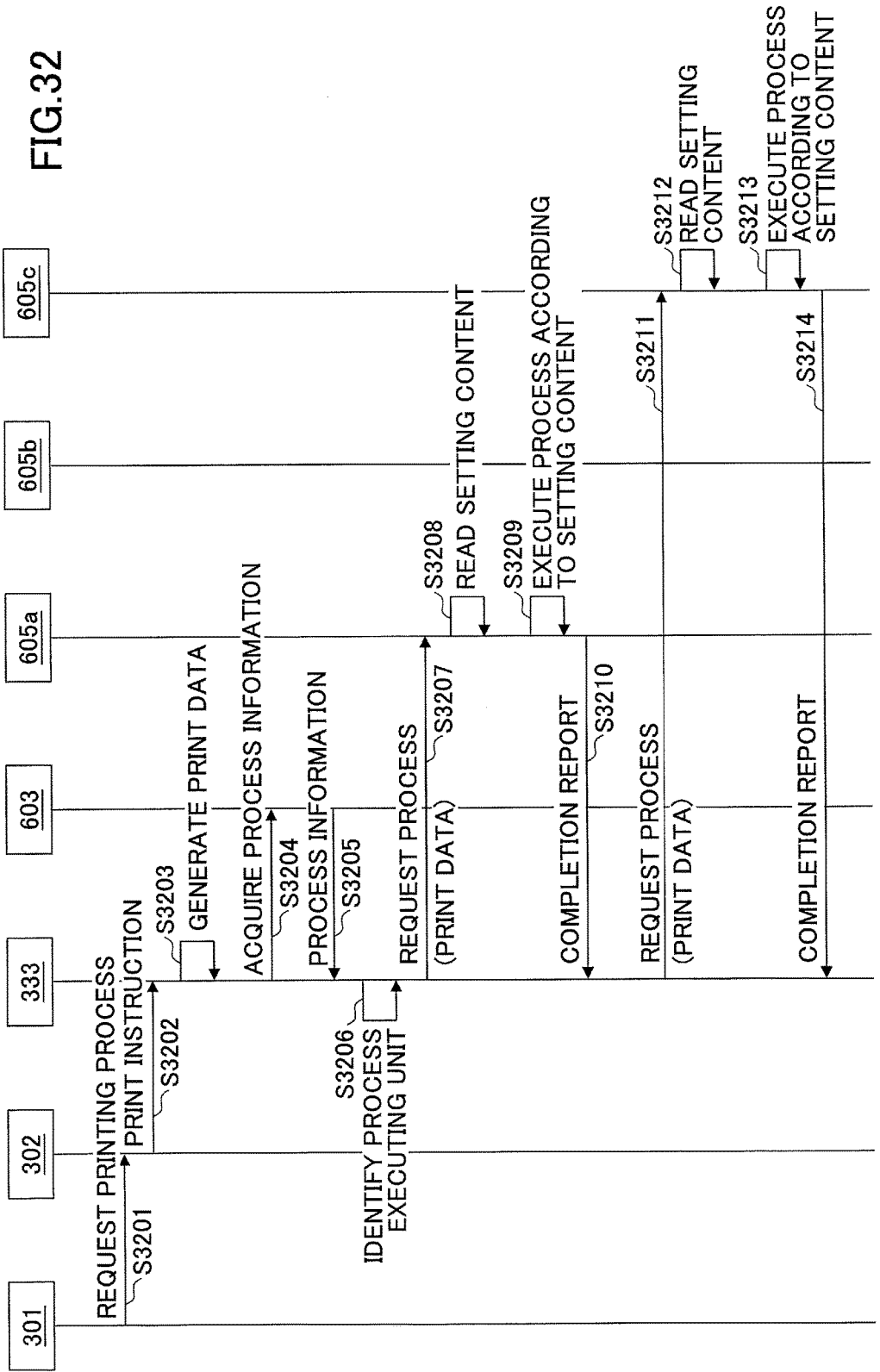

INFORMATION PROCESSING APPARATUS, INFORMATION PROCESSING SYSTEM, AND INFORMATION PROCESSING METHOD

CROSS-REFERENCE TO RELATED APPLICATION

The present application claims priority under 35 U.S.C. § 119 to Japanese Patent Application No. 2016-228196, filed on Nov. 24, 2016 and Japanese Patent Application No. 2017-156153, filed on Aug. 10, 2017, the contents of which are incorporated herein by reference in their entirety.

BACKGROUND OF THE INVENTION

1. Field of the Invention

The present invention relates to an information processing apparatus, an information processing system, and an information processing method.

2. Description of the Related Art

In the Windows Operating System (OS) from Windows (registered trademark) 2000 to Windows 7 of the related art, an architecture referred to as a Version 3 (hereinafter referred to as "V3") printer driver is adopted as the architecture of the printer driver. Furthermore, in the Windows OS on and subsequent to Windows 8, in addition to Version 3, an architecture of a new printer driver referred to as a Version 4 (hereinafter referred to as "V4") printer driver has been adopted.

The V4 printer driver employs a filter pipeline system. For example, there is known a technology that enables a vendor, including a third party, to add an individual filter module to the printer driver, to provide an individual extended function (see, for example, Patent Document 1).

Patent Document 1: Japanese Unexamined Patent Application Publication No. 2012-226582

SUMMARY OF THE INVENTION

An aspect of the present invention provides an information processing apparatus, an information processing system, and an information processing method, in which one or more of the disadvantages of the related art are reduced.

According to one aspect of the present invention, there is provided an information processing apparatus for executing a printer driver that requests an image processing apparatus to perform image processing, the information processing apparatus including a processor, in communication with a memory, executing a process including executing, by a plurality of process executors, a predetermined process in response to a request from the printer driver, the predetermined process corresponding to at least one extended function to be executed on print data; storing, in a predetermined storage area, process information that is information relating to the plurality of process executors; accepting a request for a printing process to print the print data, the request being accepted via a user interface displayed on a display device; acquiring, by the printer driver, the process information from the predetermined storage area, upon accepting the request for the printing process; and requesting, by the printer driver, at least one of the plurality of process executors to execute the predetermined process on the print data, based on the acquired process information.

BRIEF DESCRIPTION OF THE DRAWINGS

FIGS. 8A to 8C illustrate examples of process information (1) according to the first embodiment of the present invention;

FIGS. 9A and 9B illustrate examples of process information (2) according to the first embodiment of the present invention;

FIGS. 10A and 10B illustrate examples of a setting screen according to the first embodiment of the present invention;

FIGS. 17A and 17B illustrate images of examples of a setting screen according to the third embodiment of the present invention;

FIG. 24 is a diagram illustrating an example of a setting screen of a port monitor according to the fourth embodiment of the present invention;

FIGS. 28A and 28B are diagrams illustrating examples of a display screen (1) according to the fifth embodiment of the present invention;

FIGS. 30A to 30C are diagrams illustrating examples of a display screen (3) according to the fifth embodiment of the present invention;

FIG. 31 is a sequence diagram illustrating an example of an extended function setting process according to the fifth embodiment of the present invention; and FIG. 32 is a sequence diagram illustrating an example of a printing process according to the fifth embodiment of the present invention.

DETAILED DESCRIPTION OF THE PREFERRED EMBODIMENTS

In the related art, in a printer driver including a filter, when the user desires to change the process executed by the filter, the user needs to reinstall the filter, even if the process change does not require a significant change to the filter, and therefore the user has been inconvenienced.

Furthermore, with the V3 printer driver, for example, by preparing an individual port monitor, etc., it is possible to implement an extended function without adding an individual filter module to the printer driver. However, with the V4 printer driver, usage of an individual port monitor is restricted, and it is difficult for a vendor to prepare an individual port monitor and to add an individual function. Furthermore, with the V4 printer driver, there is a problem that it is not possible to prepare an individual port monitor (the port monitor cannot be changed to an individual port monitor).

As described above, in the related art, in the V4 printer driver or a printer driver having a similar restriction as the V4 printer driver, it has been difficult to add an individual extended function to the printer driver while maintaining the convenience of the user.

A problem to be solved by an embodiment of the present invention is to easily add an individual extended function to a printer driver while maintaining the convenience of a user, in a V4 printer driver or a printer driver having a similar restriction as the V4 printer driver.

In the following, embodiments of the present disclosure are described in detail by referring to the accompanying drawings.

<System Configuration>

Figure 1:
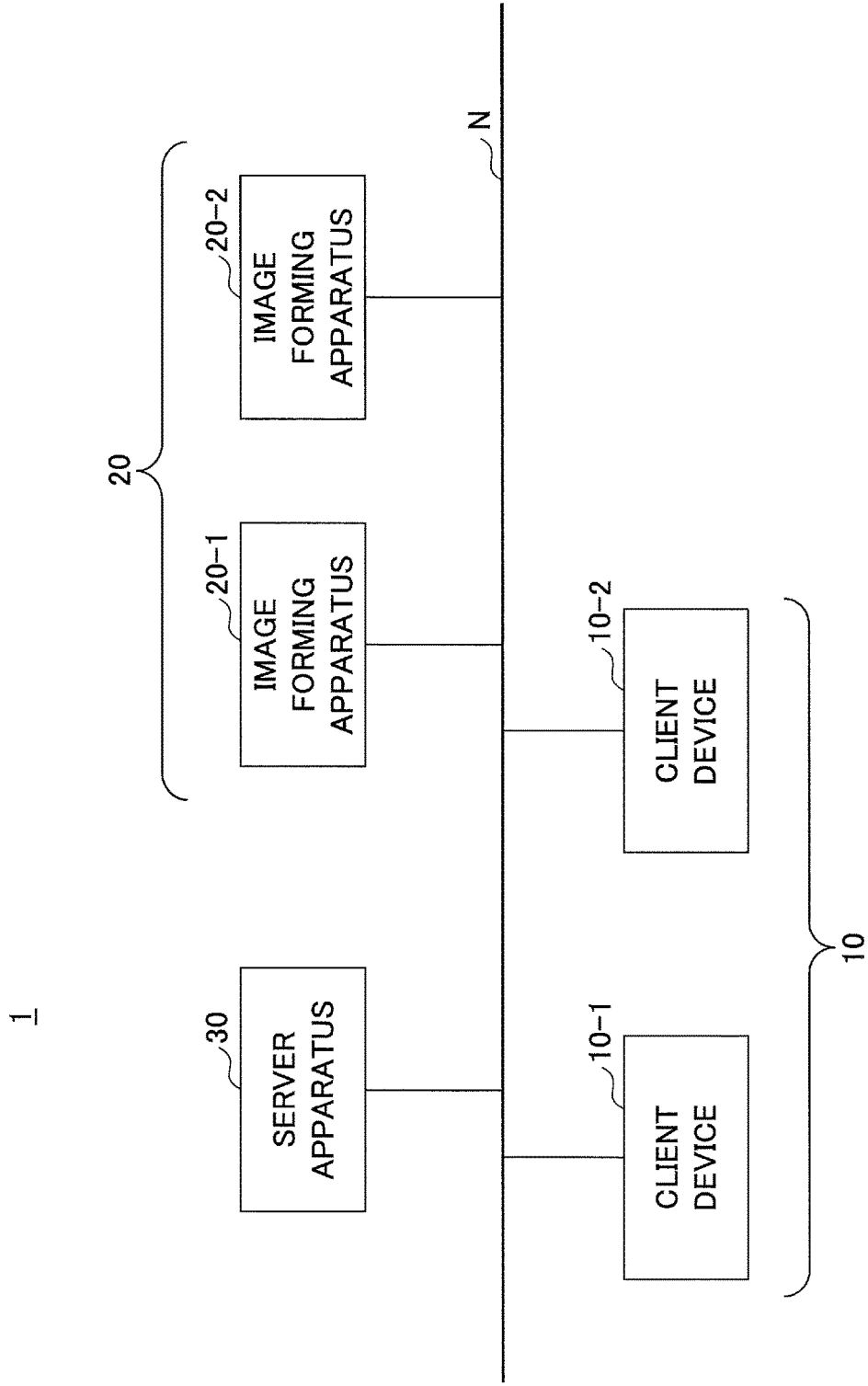
FIG. 1 is a diagram illustrating a system configuration of an example of an information processing system according to an embodiment of the present invention.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print instruction from a user, the client device 10 creates print data from data to be printed (print target data), and the client device 10 transmits the print data to the image forming apparatus 20. Alternatively, upon receiving, for example, a print instruction from a user, the client device 10 transmits print target data to the server apparatus 30.

Note that the print target data is, for example, printable electronic data, such as image data and document data. Furthermore, the print data is, for example, electronic data obtained by converting the print target data into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from print target data received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2", for example. Similarly, when the one or more image forming apparatuses 20 are to be distinguished from each other, the one or more image forming apparatuses 20 may be denoted as "image forming apparatus 20-1" and "image forming apparatus 20-2", for example.

<Hardware Configuration>

Figure 2:
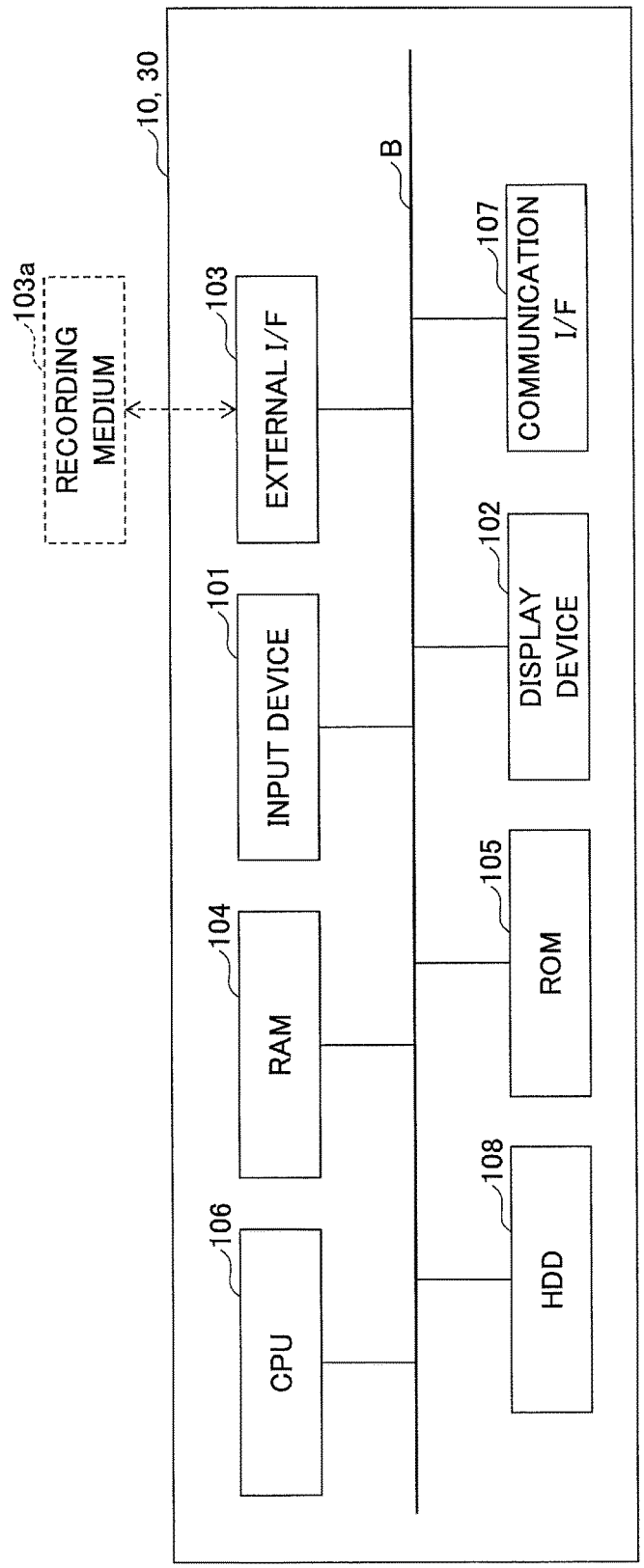
FIG. 2 is a diagram illustrating a hardware configuration of an example of each of a client device and a server apparatus according to an embodiment of the present invention.
Figure 3:
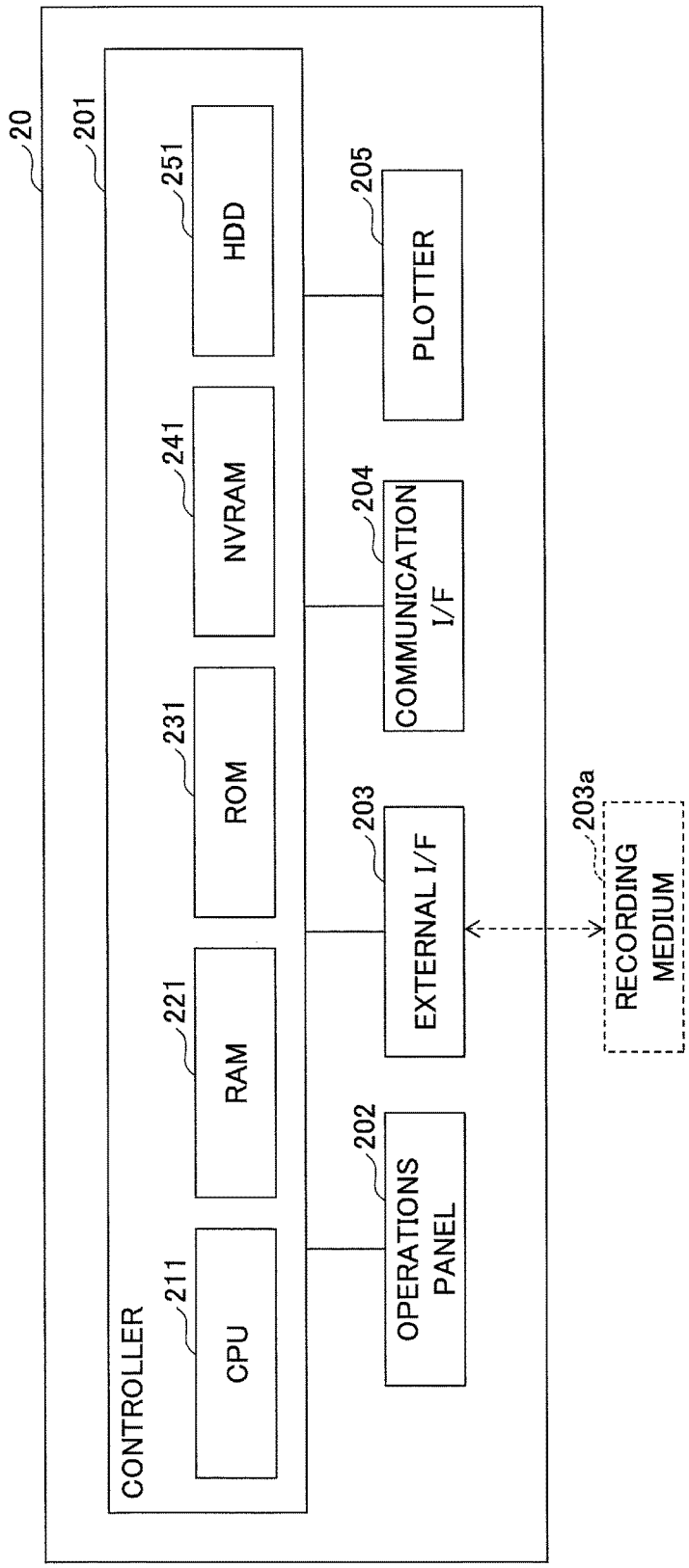
FIG. 3 is a diagram illustrating a hardware configuration of an example of an image forming apparatus according to an embodiment of the present invention.

Next, hardware configurations of the client device 10, the image forming apparatus 20, and the server apparatus 30 that are included in the information processing system 1 according to the embodiment are described by referring to FIG. 2 and FIG. 3.

«The Client Device 10 and the Server Apparatus 30»

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

«The Image Forming Apparatus 20»

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, setting information. Furthermore, the HDD 251 is a non-volatile storage device that stores various types of programs and data.

The CPU 211 is a processor that implements overall control and other functions of the image forming apparatus 20 by reading out a program, data, setting information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
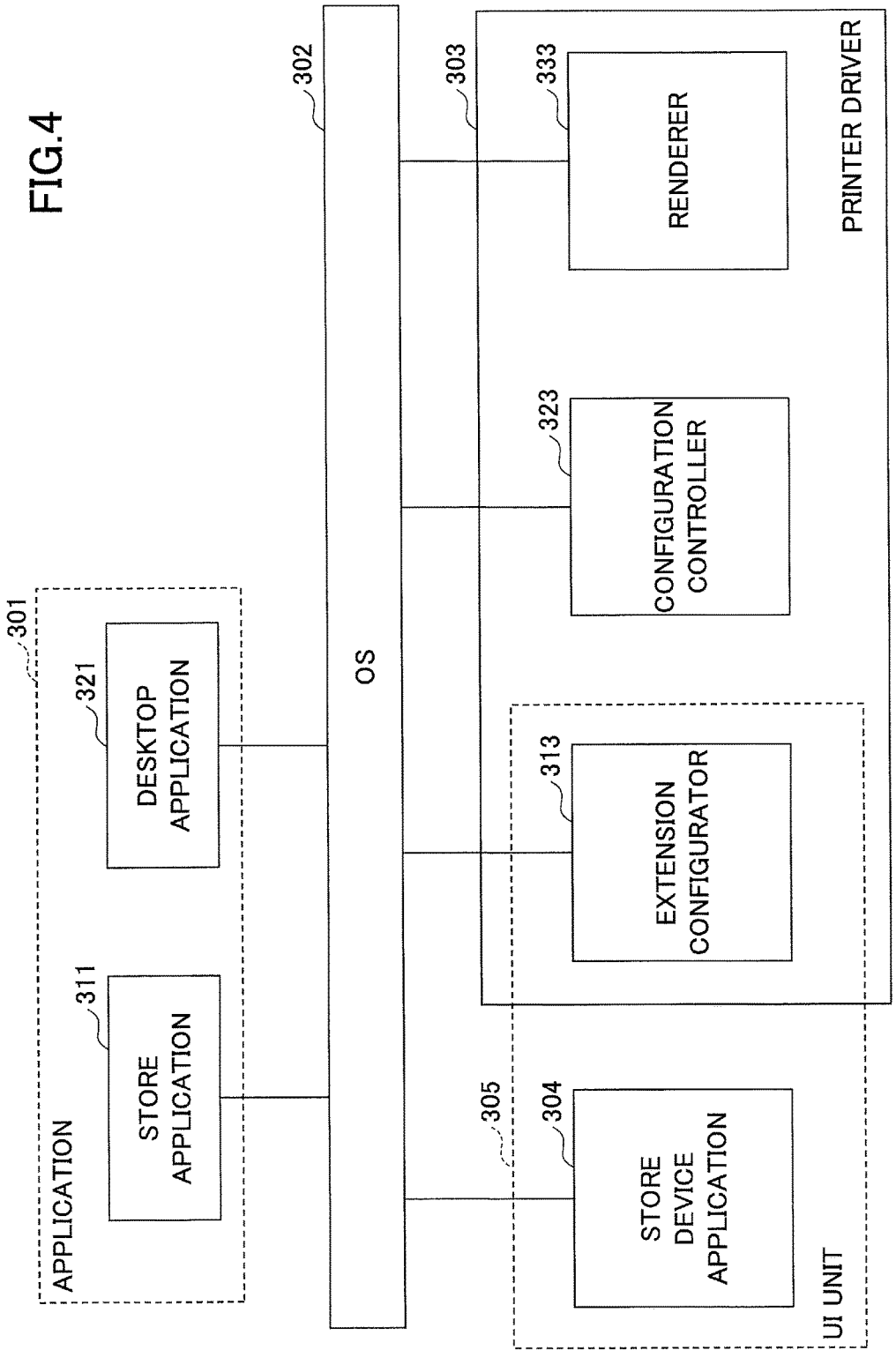
FIG. 4 is a diagram illustrating a software configuration of an example of the client device according to an embodiment of the present invention.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; and a store device application 304.

The application 301 is application software, such as document creation software, image browsing/editing software, and a browser, that is capable of indicating the OS 302 to print, in response to receiving a print instruction from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI".

The desktop application 321 is, for example, an application that can be used with a Windows OS on and prior to Windows 7.

The OS 302 is one of the Windows OSs on and subsequent to Windows 8/Windows RT.

The printer driver 303 is, for example, a Version 4 printer driver (which is denoted as "V4 printer driver", hereinafter). A V4 printer driver is based on an architecture adopted from Windows 8/Windows RT. In the following, the printer driver 303 may also be denoted as "V4 printer driver 303".

Note that, in Windows OS on and subsequent to Windows 8, the V4 printer driver can be used, in addition to the Version 3 printer driver (which is denoted as "V3 printer driver" hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print setting screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and choices in the print setting screen displayed by the extension configurator 313.

In response to detecting, by the application 301, that a print instruction for printing the print target data is received, the renderer 333 creates print data from the print target data.

Upon detecting that the store application 311 is to perform printing, the store device application 304 displays a print setting screen specific to a vendor. Note that, similar to the store application 311, the store device application 304 is available from "Windows store".

Upon detecting that the desktop application 321 is to perform printing, the printer driver 303 may create print data based on the details of the configuration that are made in the print setting screen displayed by the extension configurator 313. In contrast, upon detecting that the store application 311 is to perform printing, the printer driver 303 may create print data based on the details of the configuration that are made in the print setting screen displayed by the store device application 304.

The extension configurator 313 and the store device application 304 form a UI unit 305 for displaying a print setting screen specific to a vendor.

<Storage Area that can be Accessed by the V4 Printer Driver 303 and the Store Device Application 304>

Figure 5:
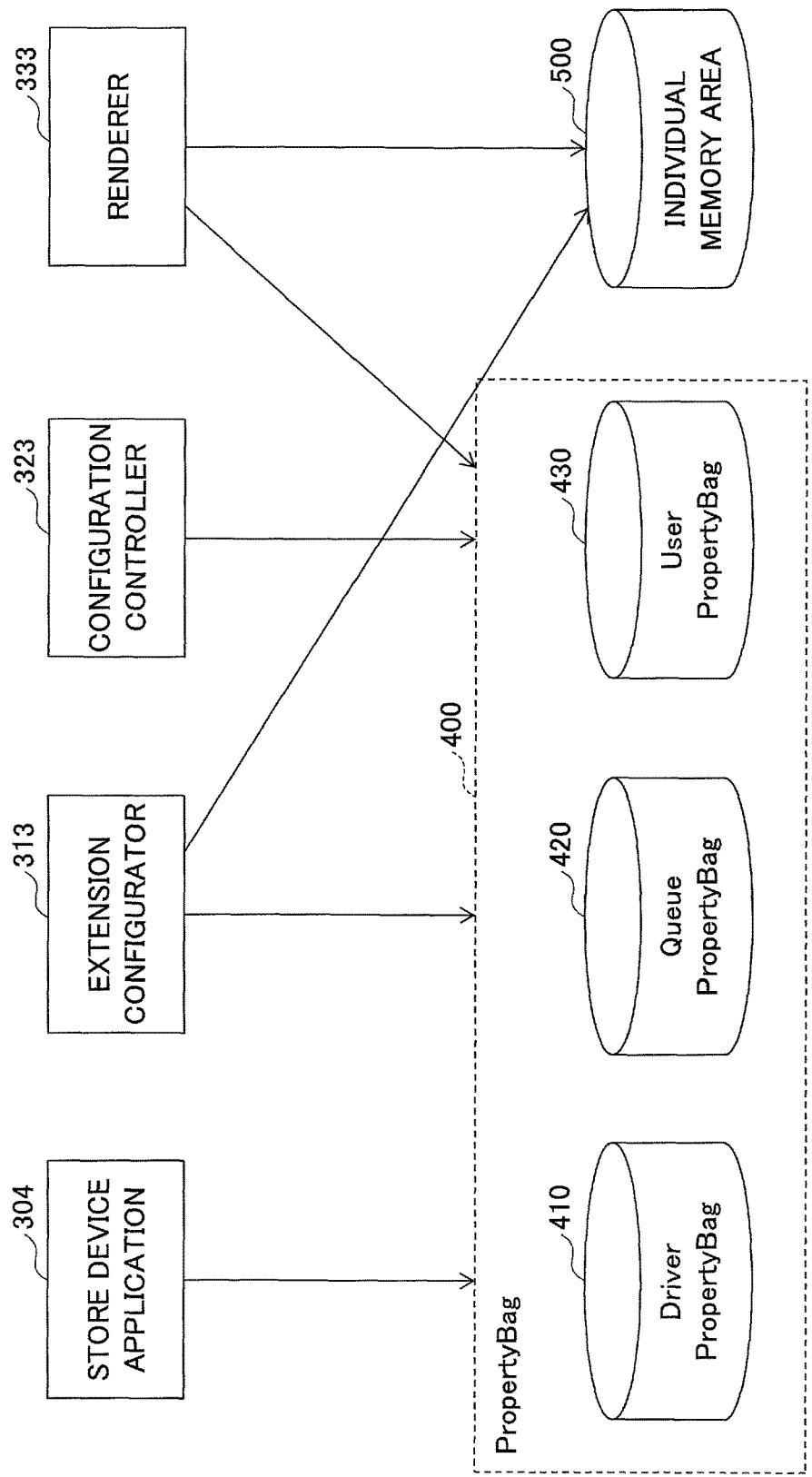
FIG. 5 is a diagram illustrating a storage area accessible by a V4 printer driver and a store device application according to an embodiment of the present invention.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as a PropertyBag 400. Note that, such access to the storage area can be executed using an Application Programming Interface (API) provided by the OS 302.

As illustrated in FIG. 5, the PropertyBag 400 includes a DriverPropertyBag 410; a QueuePropertyBag 420; and a UserPropertyBag 430.

The DriverPropertyBag 410 is a storage area for storing setting information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 333, and the store device application 304 are incapable of writing information in the DriverPropertyBag 410.

The QueuePropertyBag 420 is a storage area for storing setting information for each logical printer (printer icon). The extension configurator 313 and the store device application 304 are capable of reading out various types of information from and writing various types of information in the QueuePropertyBag 420. Furthermore, the configuration controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, setting information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

<Functional Configuration>

(Functional Configuration of Client Device)

Figure 6:
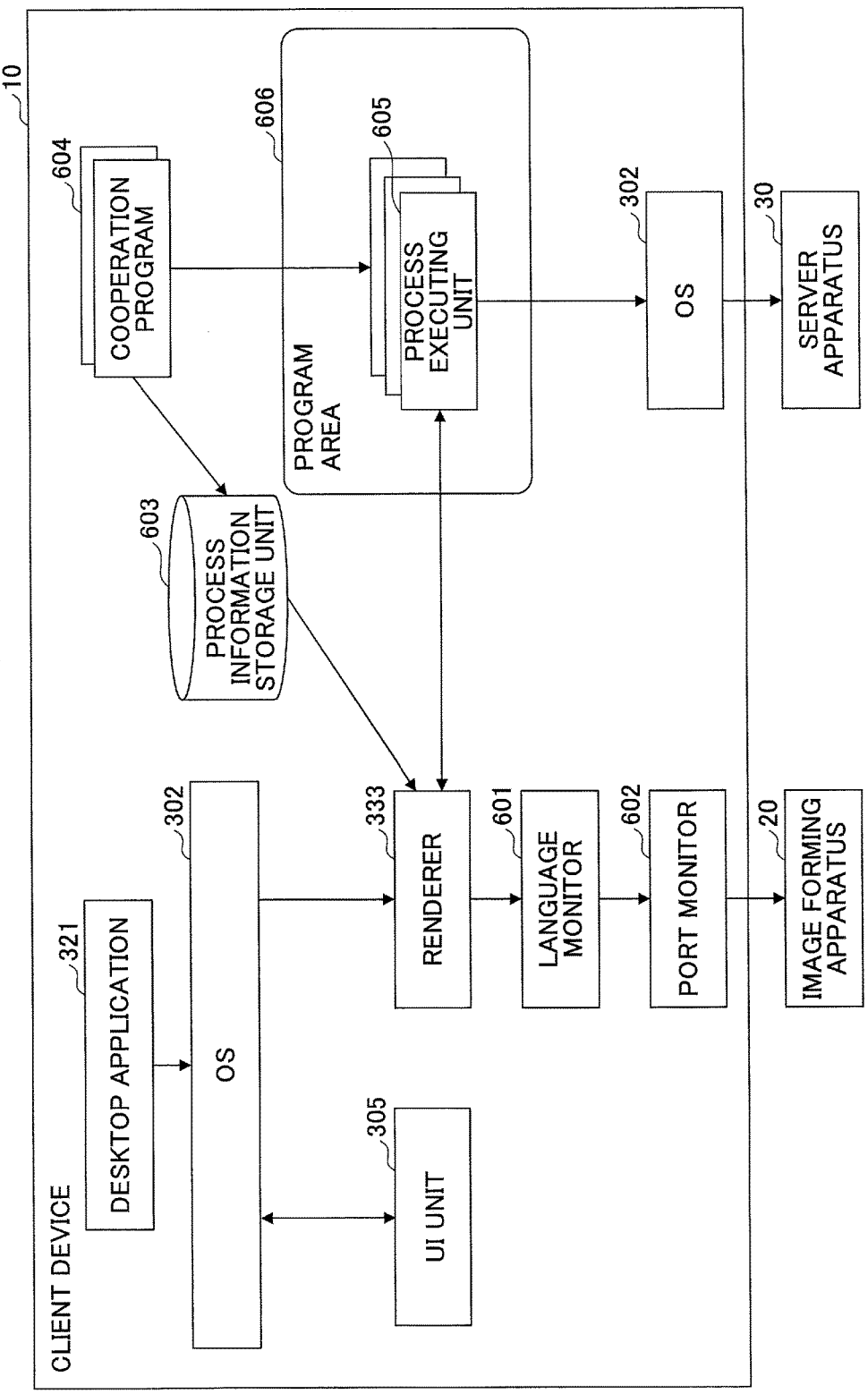
FIG. 6 is a functional block diagram of the client device according to an embodiment of the present invention.

FIG. 6 is a functional block diagram of the client device 10 according to an embodiment.

The client device (information processing apparatus) 10 is coupled to the image forming apparatus (image processing apparatus) 20 and the server apparatus 30 via a network, etc., and executes a printer driver that requests printing (image processing) to the image forming apparatus 20.

By executing programs, for example, by the CPU 106 of FIG. 2, the client device 10 can implement the desktop application 321, the OS 302, the UI unit 305, the renderer 333, a language monitor 601, a port monitor 602, a process information storage unit 603, at least one cooperation program 604, and a plurality of process executing units 605, etc. Among these functions, the desktop application 321, the OS 302, the UI unit 305, and the renderer 333 correspond to the desktop application 321, the OS 302, the UI unit 305, and the renderer 333 illustrated in FIG. 4.

The language monitor 601 is implemented by, for example, a Dynamic Link Library (DLL), etc., executed by the CPU 106, etc., in FIG. 2. The language monitor 601 receives status information indicating, for example, a printing status, etc., from the image forming apparatus 20 that supports bidirectional communication.

The port monitor 602 is implemented by, for example, a DLL, etc., executed by the CPU 106, etc., in FIG. 2. The port monitor 602 performs a print data output process according to the type of printer port (Universal Serial Bus (USB) and Transmission Control Protocol/Internet Protocol (TCP/IP), etc.).

The cooperation program 604 is executed by, for example, the CPU 106, etc., in FIG. 2. In cooperation with the printer driver 303 executed by the client device 10, for example, the cooperation program 604 provides various extended functions such as a process of modifying print data (render data), a process of reading the print data, and a process of transferring the print data, etc.

For example, when the cooperation program 604 is installed in the client device 10, the cooperation program 604 arranges (for example, copies) the plurality of process executing units 605 in a program area 606 of the client device 10. Furthermore, the cooperation program 604 stores process information relating to a process executed by each of the plurality of process executing units 605, in the process information storage unit 603.

The process executing unit 605 is, for example, a plug-in implemented by a DLL, etc., executed by the CPU 106 in FIG. 2. Under the control of the renderer 333, etc., the process executing unit 605 executes, for example, various extended functions such as a process of modifying print data, a process of reading the print data, and a process of transferring the print data, etc.

The process information storage unit (storage) 603 is implemented by, for example, the individual memory area 500 and the QueuePropertyBag 420, etc., in FIG. 5. The process information storage unit 603 stores process information that is information relating to a process executed by each of the plurality of process executing units 605. As an example of the individual memory area 500, for example, a registry HKEY_LOCAL_MACHINE (HKLM), etc., used in a typical normal Windows application, is used.

Subsequently, specific functional configurations and process flows of the client device 10 will be described by exemplifying several embodiments.

First Embodiment

Figure 7:
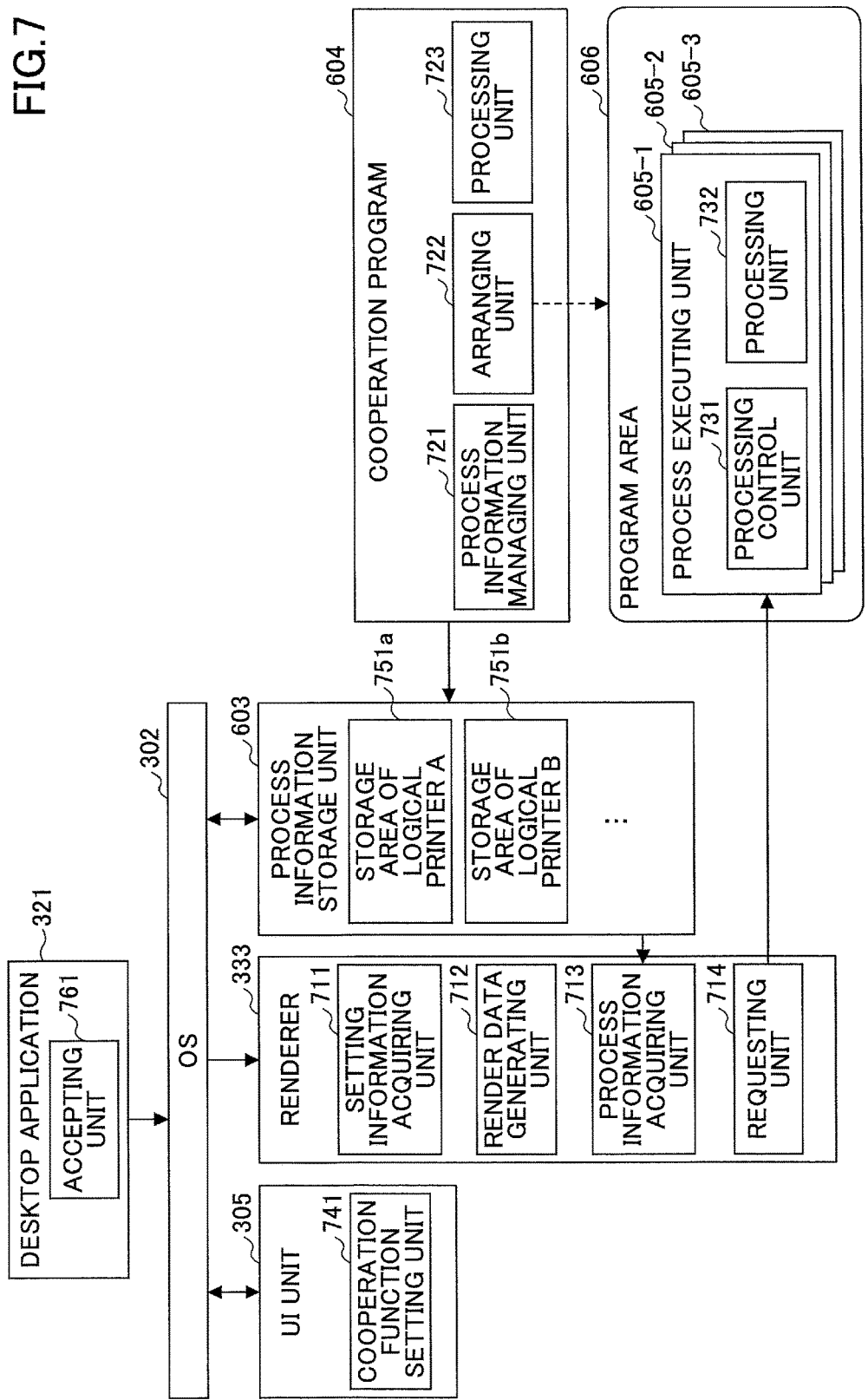
FIG. 7 is a functional block diagram of a renderer, a UI unit, and a cooperation program according to a first embodiment of the present invention.

FIG. 7 is a functional block diagram of the renderer 333, the UI unit 305, and the cooperation program 604 according to a first embodiment.

Functional Configuration of Renderer—First Embodiment

The renderer 333 is implemented by, for example, a program (printer driver 303) executed by the CPU 106 in FIG. 2. The renderer 333 includes a setting information acquiring unit 711, a render data generating unit 712, a process information acquiring unit 713, and a requesting unit 714, etc.

For example, the setting information acquiring unit 711 acquires a PrintTicket transferred from the desktop application 321, and print setting information included in the PropertyBag 400 in FIG. 5, etc. Furthermore, the setting information acquiring unit 711 acquires information specifying a logical printer that is the target of a printing process, transferred from the desktop application 321 via the OS 302.

Based on the print setting information acquired by the setting information acquiring unit 711, the render data generating unit 712 converts the data to be the target of printing into print data (render data) that can be processed by the image forming apparatus 20.

The process information acquiring unit 713 acquires process information corresponding to the specified logical printer, from the process information storage unit 603. In the first embodiment, the process information storage unit 603 includes storage areas (for example, the QueuePropertyBag 420, etc.) corresponding to the respective logical printers such as a storage area 751a for a logical printer A, a storage area 751b for a logical printer B, . . . , etc. For example, when the logical printer A is specified as the logical printer that is the target of a printing process, the process information acquiring unit 713 acquires process information from the storage area 751a for the logical printer A. Note that examples of the process information are described later with reference to FIGS. 8A to 9B.

The requesting unit 714 requests at least one of the plurality of process executing units 605 to execute processes based on the process information acquired by the process information acquiring unit 713.

Functional Configuration of Cooperation Program—First Embodiment

The client device 10 executes, for example, the cooperation program 604 by the CPU 106 in FIG. 2, to implement a process information managing unit 721, an arranging unit 722, and a processing unit 723, etc.

For example, when the cooperation program 604 is installed in the client device 10, the arranging unit 722 arranges the plurality of process executing units 605-1 to 605-3, which execute various extended functions, in the program area 606 of the client device 10. For example, the arranging unit 722 copies the plurality of process executing units 605-1 to 605-3 into the program area 606 that can be accessed from the renderer 333 of the printer driver 303, so as to be accessible from the renderer 333 of the printer driver 303.

Note that in the following description, the "process executing unit 605" is used to indicate any process executing unit 605 among the plurality of process executing units 605-1 to 605-3. Furthermore, the number of the process executing units 605 illustrated in FIG. 7 is one example, and the number of the process executing units 605 may be another number that is two or more.

The process information managing unit 721 stores, in the storage area for each logical printer, the process information relating to a process that is requested to be executed by the renderer 333, among the processes executed by the plurality of process executing units 605-1 to 605-3.

The processing unit 723 executes various processes to be executed by the cooperation program 604; for example, a setting process of the cooperation program 604, a log collection process, and an adjustment process with other cooperation programs, etc.

Functional Configuration of Process Executing Unit—First Embodiment

The process executing unit 605 is implemented by, for example, a program (DLL, etc.) executed by the CPU 106 in FIG. 2. The process executing unit 605 includes a process control unit 731 and a processing unit 732, etc.

The processing unit 732 executes processes such as a modifying process (first process) of modifying the print data, a reading process (second process) of reading information from the print data, and a transferring process of transferring the print data (third process).

The process control unit 731 accepts a process request from the renderer 333, and causes the processing unit 732 to execute a process in accordance with the accepted processing request.

Table 1 indicates examples of processes executed by the process executing unit 605.

TABLE 1

| PROCESS TYPE | PROCESS CONTENT | EXAMPLE OF PROCESS CONTENT |
|---|---|---|
| MODIFY | MODIFY PRINT DATA | COLOR → MONOCHROME CONVERSION PROCESS, AUTHENTICATION PROCESS, PREVIEW PROCESS, PROCESS OF MASKING USER NAME, ETC. |
| READ | REFER TO PRINT DATA | LOG COLLECTION PROCESS, CHARGE PREDICTION PROCESS, ETC. |
| TRANSFER | TRANSFER PRINT DATA | PROCESS OF SAVING IN SHARED FOLDER, PROCESS OF UPLOADING TO CLOUD, PROCESS OF RETURNING TO PRINTER DRIVER, ETC. |

As indicated in Table 1, the processes executed by the process executing unit 605 are divided into three process types; for example, modifying (Modify), reading (Read), and transferring (Transfer).

The process of the process type of "Modify" (hereinafter referred to as a "modifying process") includes a process of modifying print data as a process content; for example, a color→monochrome conversion process, an authentication process, a preview process, and a process of masking the user name, etc.

The process of the process type of "Read" (hereinafter referred to as a "reading process") includes a process of referring to print data (acquisition of information) as a process content; for example, a log collection process, and a charge prediction process.

The process of the process type "transfer" (hereinafter referred to as a "transferring process") includes a process for transferring print data as a process content; for example, a process of saving the print data in a shared folder, a process of uploading the print data to cloud, and a process of returning the print data to the printer driver 303, etc.

FIGS. 8A to 9B illustrate examples of process information according to the first embodiment.

FIG. 8A illustrates an example of an image of process information 810 of a modifying process. The process information 810 of the modifying process includes information 811 indicating the name of the process executing unit 605, information (path information) 812 indicating the path where the process executing unit 605 is stored, information 813 indicating the process type of the process executing unit 605, etc. As illustrated in FIG. 8A, a character string "modify" is included in the information 813 indicating the process type of the process information 810 of the modifying process.

FIG. 8B illustrates an example of an image of process information 820 of the reading process. The information indicating the process type of the process information 820 of the reading process includes a character string "read". Similarly, FIG. 8C illustrates an example of an image of process information 830 of the transferring process. The information indicating the process type of the process information 830 of the transferring process includes the character string "transfer".

FIG. 9A illustrates an example of an image of process information 910 to be executed in series. As illustrated in FIG. 9A, a plurality of pieces of process information (modifying processes 912 and 913) to be executed in series are listed in, for example, a square bracket 911 via a comma ",".

FIG. 9B illustrates an example of an image of process information 920 to be executed in parallel. As illustrated in FIG. 9B, a plurality of pieces of process information (reading processes 922 and 924) executed in parallel are closed with square brackets 921 and 923 and listed via a comma ",".

In this manner, the process information may include process information relating to a plurality of processes. Furthermore, the process information may include both process information to be executed in series and process information to be executed in parallel.

Referring back to FIG. 7, the description of the functional configuration will be continued.

Functional Configuration of UI Unit—First Embodiment

For example, as illustrated in FIG. 4, the UI unit 305 includes the store device application 304 and the extension configurator 313 of the printer driver 303, etc. The UI unit 305 displays a setting screen for making settings relating to the printer driver 303, and applies a setting operation by the user to the setting information. Furthermore, the UI unit 305 according to the present embodiment includes a cooperation function setting unit 741.

The cooperation function setting unit 741 displays a setting screen for selecting a process to be executed by the logical printer from a plurality of processes corresponding to the process information stored in the storage area for each logical printer, and accepts a setting operation by the user.

Figure 10A:
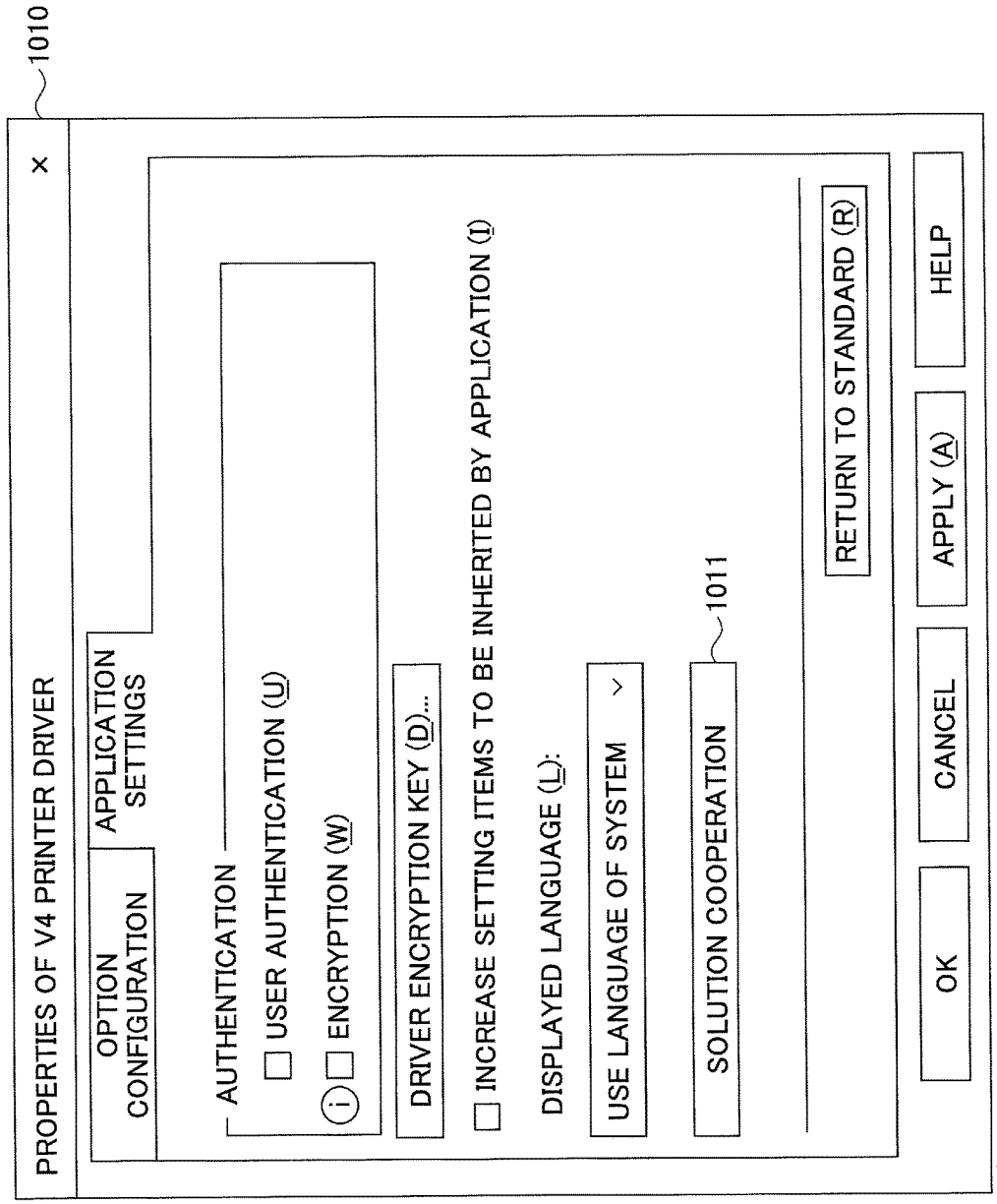

For example, the cooperation function setting unit 741 is invoked from a list of operations displayed on a context menu displayed when a logical printer icon is right-clicked, and for example, the cooperation function setting unit 741 displays a setting screen as illustrated in FIGS. 10A and 10B, on the display device 102, etc.

FIGS. 10A and 10B are diagrams illustrating examples of a setting screen according to the first embodiment.

FIG. 10A illustrates an example of an extended function setting screen 1010 displayed by the cooperation function setting unit 741. The extended function setting screen 1010 includes a "solution cooperation" button 1011 for making settings relating to the cooperation program 604. By selecting the "solution cooperation" button 1011, the user can display, for example, an extended function selection screen 1020 as illustrated in FIG. 10B.

In the extended function selection screen 1020 illustrated in FIG. 10B, a list 1021 of processes executable by the plurality of process executing units 605 is displayed, and the user selects whether to execute a process by a check box 1022 of each process. The example of FIG. 10B illustrates a case where settings are made such that the processes having the process names "monitor data" and "cloud transfer" are executed and the process of "individual authentication" is not executed.

As described above, in the present embodiment, for each logical printer, the user selects, from among the processes executed by the plurality of process executing units 605, the process to be executed, using the extended function selection screen 1020 as illustrated in FIG. 10B.

Functional Configuration of Desktop Application—First Embodiment

The desktop application 321 is a general application such as document creation, presentation, web browser, and a mail client, etc. The desktop application 321 includes an accepting unit 761 that displays, for example, a print operation acceptance screen 1100 as illustrated in FIG. 11 on a display unit such as the display device 102 and accepts a specification of a logical printer for a printing process, together with a print process request.

Figure 11:
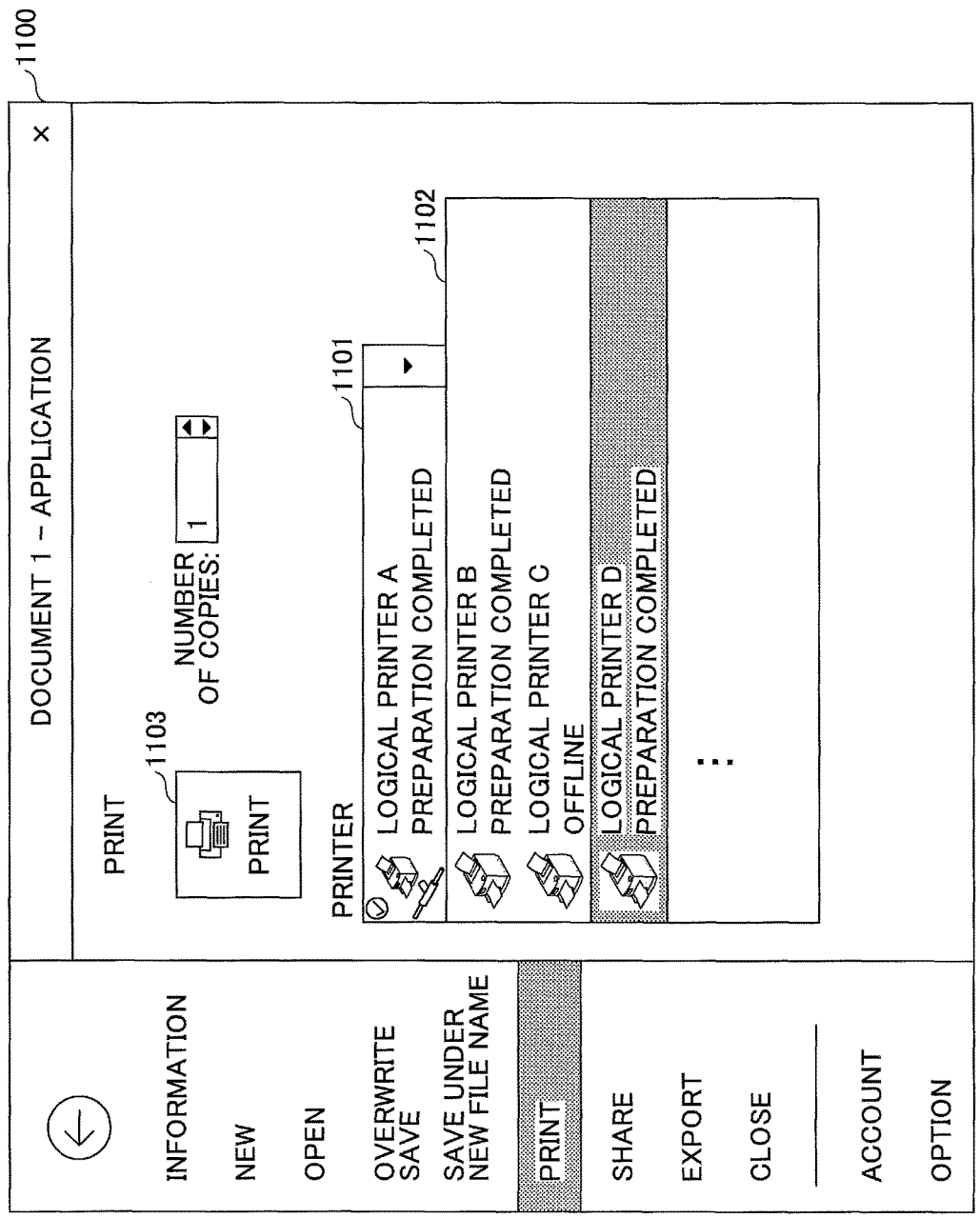
FIG. 11 is a diagram illustrating an example of a print operation acceptance screen according to the first embodiment of the present invention.

FIG. 11 is a diagram illustrating an example of a print operation acceptance screen according to the first embodiment. The print operation acceptance screen 1100 illustrated in FIG. 11 is an example of a display screen displayed when the user performs printing with the desktop application 321.

On the print operation acceptance screen 1100 illustrated in FIG. 11, the user can select a button 1101 for displaying a list of logical printers 1102, display the list of logical printers, and select a logical printer to be used for printing. Furthermore, the user can request a printing process by selecting a print button 1103. The accepting unit 761 accepts a specification of the logical printer and a print process request input by the user on the print operation acceptance screen 1100.

Process Flow—First Embodiment

Next, the flow of processes of the information processing method according to the first embodiment will be described.

Example of Printing Process—First Embodiment

Figure 12:
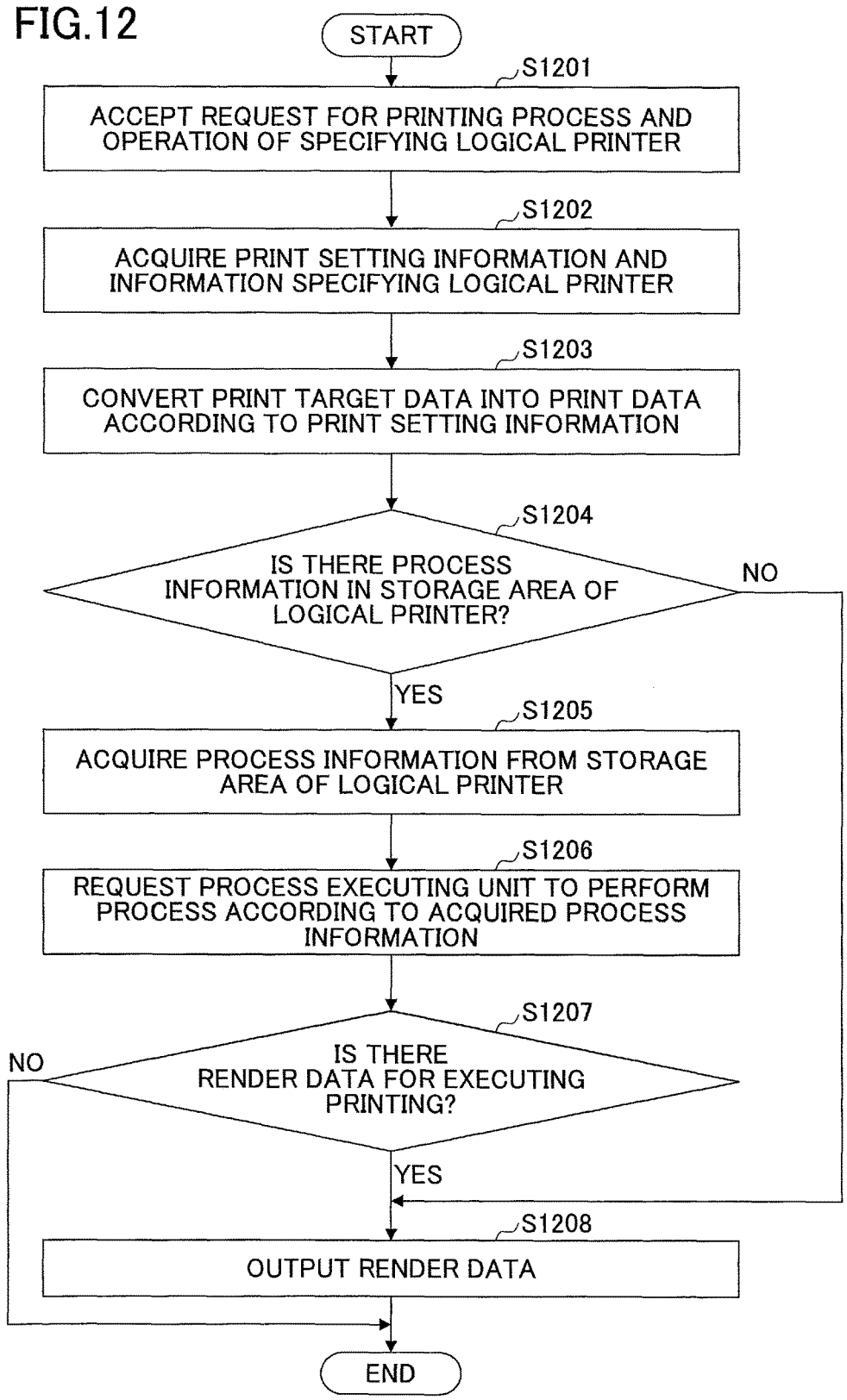
FIG. 12 is a flowchart illustrating an example of a printing process according to the first embodiment of the present invention.

FIG. 12 is a flowchart illustrating an example of a printing process according to the first embodiment. This process indicates an example of a printing process executed by the client device 10 when the user performs a printing operation on the print operation acceptance screen 1100 as illustrated in FIG. 11.

In step S1201, when the accepting unit 761 of the desktop application 321 accepts a request for a print process and an operation for specifying the logical printer by the user, the renderer 333 of the printer driver 303 executes the processes of step S1202 and onward. Note that, for example, when the print button 1103 is selected without performing the operation of specifying a logical printer on the print operation acceptance screen 1100 illustrated in FIG. 11, a process is executed assuming that a predetermined logical printer has been selected.

In step S1202, the renderer 333 acquires print setting information and information specifying the logical printer from the desktop application 321 via the OS 302. For example, the setting information acquiring unit 711 acquires print setting information from PrintTicket, etc., which is print setting information transferred from the desktop application 321.

In step S1203, the render data generating unit 712 of the renderer 333 converts the data to be printed into print data that can be printed by the image forming apparatus 20, according to the print setting information acquired by the setting information acquiring unit 711.

In step S1204, the process information acquiring unit 713 of the renderer 333 determines whether there is process information in the storage area (for example, the storage area 751a for the logical printer A) corresponding to the specified logical printer included in the process information storage unit 603. For example, the process information acquiring unit 713 determines whether the process information illustrated in FIGS. 8A to 9B is stored in the QueuePropertyBag 420, etc., that stores information of the specified logical printer.

When there is no process information in the storage area corresponding to the specified logical printer, the process information acquiring unit 713 causes the process to proceed to step S1208. Conversely, when there is process information in the storage area corresponding to the specified logical printer, the process information acquiring unit 713 causes the process to proceed to step S1205.

In step S1205, the process information acquiring unit 713 acquires the process information from the storage area corresponding to the specified logical printer (for example, the storage area 751a for the logical printer A, etc.).

In step S1206, the requesting unit 714 of the renderer 333 requests the process executing unit 605 to perform a process in accordance with the process information acquired by the process information acquiring unit 713.

For example, when the process information is the process information 810 of the modifying process as illustrated in FIG. 8A, the requesting unit 714 requests "Aplugin.dll" that is an example of the process executing unit 605, to execute the modifying process in accordance with the information 812 indicating the path in which the process executing unit 605 is stored.

Furthermore, for example, when the process information is the process information 910 to be executed in series as illustrated in FIG. 9A, the requesting unit 714 requests "Aplugin.dll" to execute a first modifying process, and after the first modifying process is completed, the requesting unit 714 requests "Bplugin.dll" to execute a second modifying process.

Furthermore, when the process information is the process information 920 to be executed in parallel as illustrated in FIG. 9B, the requesting unit 714 requests "1 plugin.dll" to execute a first read process and also requests "2 plugin.dll" to execute a second read process, in parallel with the first read process.

Note that the processes of steps S1204 and S1205 may be performed in parallel with the process of step S1203.

Furthermore, the processes of steps S1204 to S1206 may be performed before generation of print data in step S1203. For example, the requesting unit 714 may request the process executing unit 605 that modifies the print setting information, to execute a process, before the print data is generated.

Furthermore, the processes of steps S1204 to S1206 may be executed at different timings from the processes illustrated in FIG. 12, for example, during the generation of print data, these processes may be executed a plurality of times every time the generation of print data of one page is completed.

In step S1207, the renderer 333 determines whether there is print data (render data) to be printed.

For example, when print data is not returned from the process executing unit 605 to the renderer 333 in step S1206, for example, when the process executing unit 605 transfers the print data to the server apparatus 30, the renderer 333 determines that there is no print data for executing printing. In this case, the renderer 333 ends the process.

Conversely, when print data is returned from the process executing unit 605 to the renderer 333 in step S1206, the renderer 333 determines that there is print data to be printed. In this case, the renderer 333 outputs the print data (render data) to the image forming apparatus 20 in step S1208.

By the above processes, the renderer 333 of the printer driver 303 can cause a plurality of process executing unit 605 to execute various processes (extended functions) on the print data.

As described above, according to the present embodiment, an individual extended function can be easily added to the printer driver 303 while maintaining the convenience of a user, in a V4 printer driver or a printer driver having a similar restriction as the V4 printer driver.

Furthermore, according to the present embodiment, it is possible to easily add an individual extended function to the printer driver 303 without reinstalling or updating the printer driver 303. Note that in the V3 printer driver of the related art, it has been possible to use a plurality of extended functions by changing the port monitor; however, but it has not been possible to use a plurality of extended functions introduced at different timings.

Furthermore, according to the present embodiment, when a plurality of logical printers are created for one printer driver 303, it is possible to execute, in combination, the extended functions that are different for each logical printer.

Second Embodiment

In a second embodiment, an example where the process information storage unit 603 includes a storage area for a printer driver in addition to a storage area for each logical printer (the storage area 751a for the logical printer A and the storage area 751b for the logical printer B, etc.) will be described.

Functional Configuration—Second Embodiment

Figure 13:
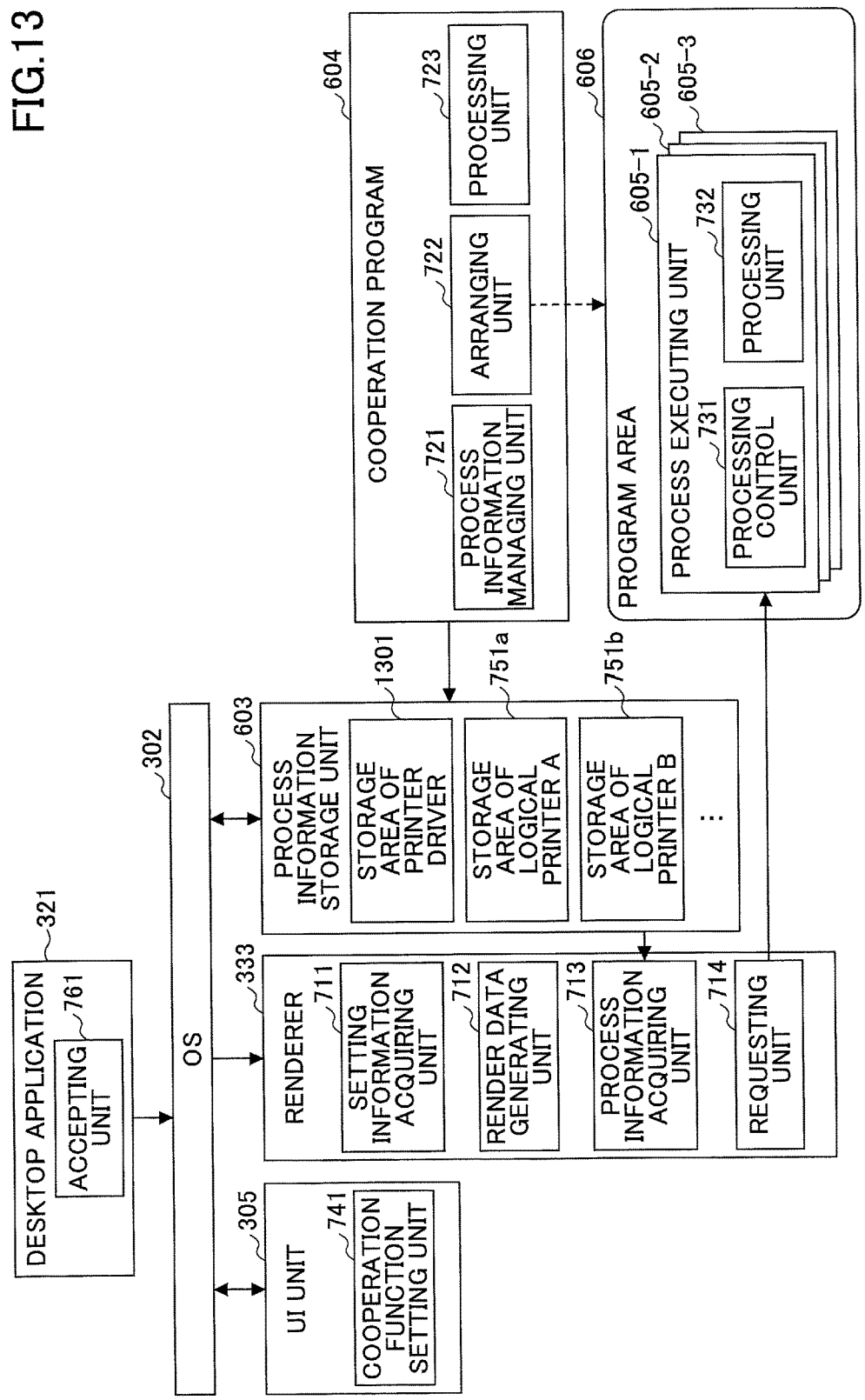
FIG. 13 is a functional block diagram of the renderer, the UI unit, and the cooperation program according to a second embodiment of the present invention.

FIG. 13 is a functional block diagram of the renderer 333, the UI unit 305, and the cooperation program 604 according to the second embodiment. The process information storage unit 603 illustrated in FIG. 13 includes a storage area 1301 for the printer driver, in addition to the storage area for each logical printer included in the process information storage unit 603 according to the first embodiment illustrated in FIG. 7. Note that other functional configurations are the same as the functional configurations according to the first embodiment illustrated in FIG. 7, and therefore the description will focus mainly on the differences from the functional configuration according to the first embodiment.

The storage area 1301 for the printer driver is implemented by, for example, the individual memory area 500 in FIG. 5, and stores process information of a process to be commonly executed by the respective plurality of process executing units 605. As an example of the individual memory area 500, as described above, a registry HKLM, etc., used in a normal Windows application is used.

Since the process information stored in the storage area 1301 for the printer driver is applied to all of the logical printers corresponding to the same printer driver 303, the user is exempted from the trouble of making a setting for each of the logical printers corresponding to one printer driver 303.

Furthermore, the storage area 1301 for the printer driver 303 is provided for each of the printer drivers 303, and process information is also stored for each of the printer drivers 303. Accordingly, the process information stored in the storage area 1301 for one of the printer drivers 303 is automatically applied to a newly created logical printer corresponding to the one printer driver 303.

Process Flow—Second Embodiment

Figure 14:
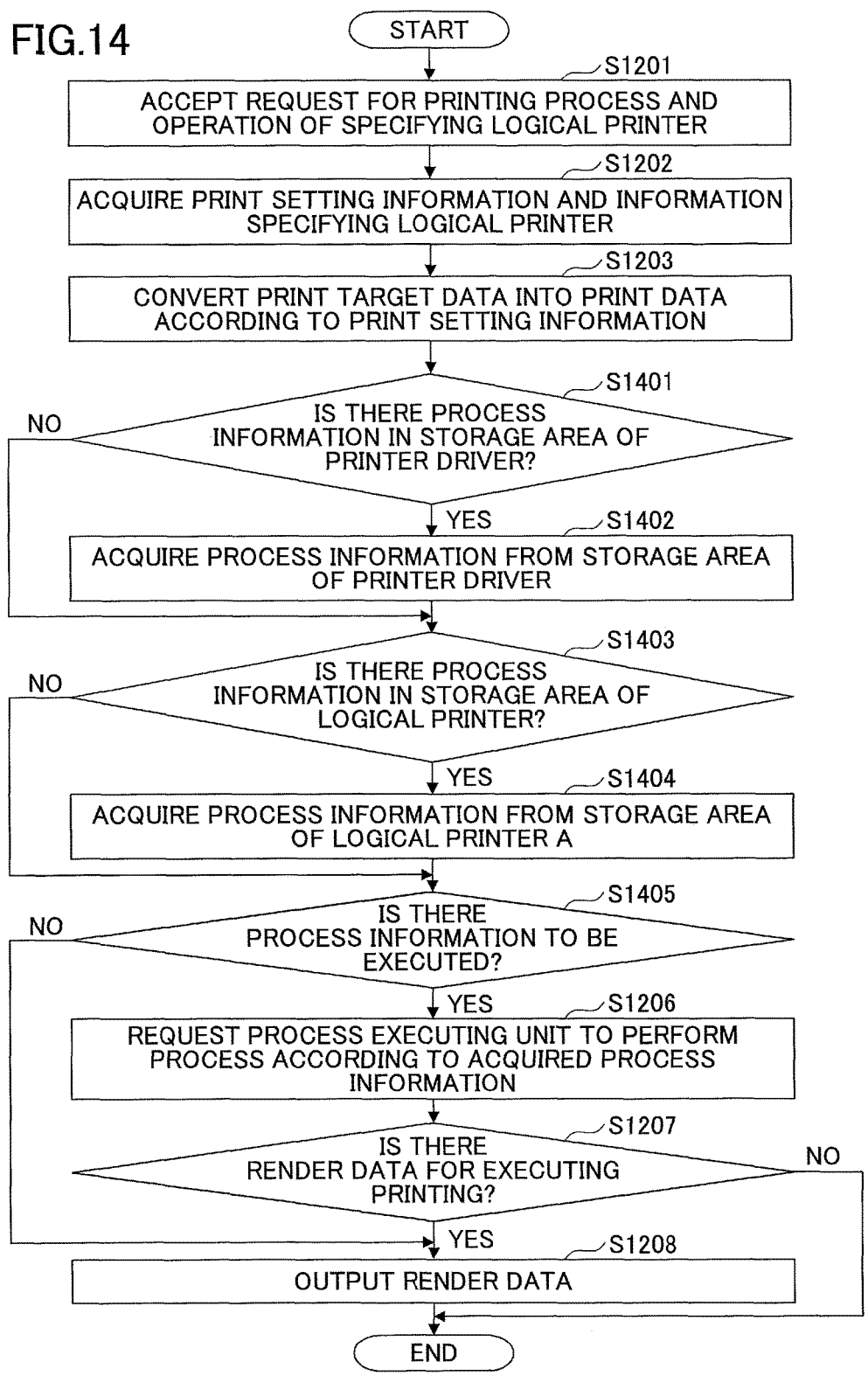
FIG. 14 is a flowchart illustrating the flow of a printing process according to the second embodiment of the present invention.

FIG. 14 is a flowchart illustrating the flow of a printing process according to the second embodiment. Since the processes of steps S1201 to S1203 and S1206 to S1208 in FIG. 14 are similar to the printing process according to the first embodiment illustrated in FIG. 12, the description will focus mainly on the differences from the first embodiment.

In step S1401, the process information acquiring unit 713 of the renderer 333 determines whether there is process information in the storage area 1301 for the printer driver corresponding to the printer driver 303, included in the process information storage unit 603.

When there is no process information in the storage area 1301 for the printer driver, the process information acquiring unit 713 causes the process to proceed to step S1403. Conversely, when there is process information in the storage area 1301 for the printer driver, the process information acquiring unit 713 causes the process to proceed to step S1402.

In step S1402, the process information acquiring unit 713 acquires the process information from the storage area 1301 for the printer driver.

In step S1403, the process information acquiring unit 713 of the renderer 333 determines whether there is process information in the storage area (for example, the storage area 751a for the logical printer A) corresponding to the specified logical printer, included in the process information storage unit 603.

When there is no process information in the storage area corresponding to the specified logical printer, the process information acquiring unit 713 causes the process to proceed to step S1405. Conversely, when there is process information in the storage area corresponding to the specified logical printer, the process information acquiring unit 713 causes the process to proceed to step S1404.

In step S1404, the process information acquiring unit 713 acquires the process information from the storage area corresponding to the specified logical printer.

In step S1405, the process information acquiring unit 713 determines whether there is process information to be executed. For example, when process information is acquired in either one of steps S1402 and S1404, it is determined that there is process information to be executed.

When there is no process information to be executed, the process information acquiring unit 713 causes the process to proceed to step S1208. Conversely, when there is process information to be executed, the process information acquiring unit 713 causes the process to proceed to step S1206.

According to the printing process illustrated in FIG. 14, the printer driver 303 is able to request the process executing unit 605 to perform a process based on the process information stored in the storage area 1301 for the printer driver and the process information stored in the storage area for each logical printer.

Third Embodiment

In a third embodiment, a process of storing process information in the process information storage unit 603 will be described.

Functional Configuration—Third Embodiment

Figure 15:
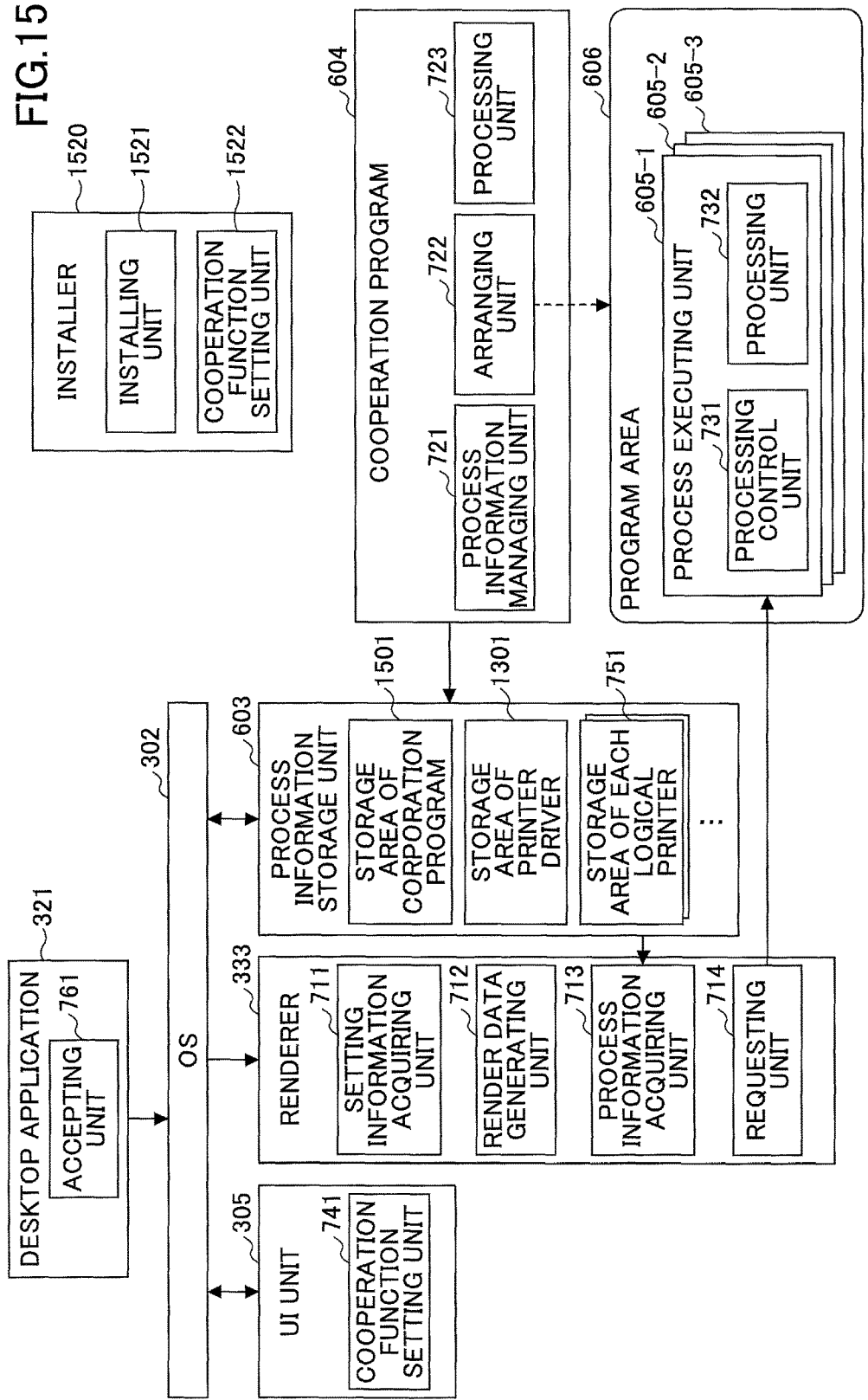
FIG. 15 is a functional block diagram of the renderer, the UI unit, and the cooperation program according to a third embodiment of the present invention.

FIG. 15 is a functional block diagram of the renderer 333, the UI unit 305, and the cooperation program 604 according to the third embodiment.

The process information storage unit 603 illustrated in FIG. 15 includes the storage area 1301 for the printer driver, the storage area 751 for each logical printer, and a storage area 1510 for a cooperation program.

Among the aforementioned storage areas, the storage area 1301 for the printer driver corresponds to the storage area 1301 for the printer driver according to the second embodiment illustrated in FIG. 13. The storage area 751 for each logical printer corresponds to the storage area 751a for the logical printer A, the storage area 751b for the logical printer B, . . . , according to the second embodiment illustrated in FIG. 13.

A storage area 1501 for a newly added cooperation program is implemented by, for example, a registry HKLM used by the cooperation program 604, and the storage area 1501 stores process information of the process executing unit 605 managed by the cooperation program 604.

Furthermore, an installer 1520 illustrated in FIG. 15 is a program executed by the CPU 106 in FIG. 2 when installing the cooperation program 604 or the printer driver 303 in the client device 10. Note that the installer 1520 for installing the cooperation program 604 and the installer 1520 for installing the printer driver 303 may be different programs or the same program.

The installer 1520 includes an installing unit 1521 and a cooperation function setting unit 1522.

The installing unit 1521 installs the cooperation program 604 or the printer driver 303 in the client device 10. For example, the installing unit 1521 stores the cooperation program 604 in the HDD 108, etc., of the client device 10 and registers the cooperation program 604 in the OS 302 so that the cooperation program 604 can be executed. Alternatively, the installing unit 1521 stores the printer driver 303 in the HDD 108, etc., of the client device 10 and registers the printer driver 303 in the OS 302 so that the printer driver 303 can be executed.

When the installing unit 1521 installs the cooperation program 604 or the printer driver 303 in the client device 10, the cooperation function setting unit 1522 displays a setting screen for accepting a setting of the cooperation function, and accepts the setting operation of the user.

Note that the other functional configurations illustrated in FIG. 15 are the same as the functional configurations according to the second embodiment illustrated in FIG. 13.

Process Flow—Third Embodiment

Installation Process of Cooperation Program—Third Embodiment

Figure 16:
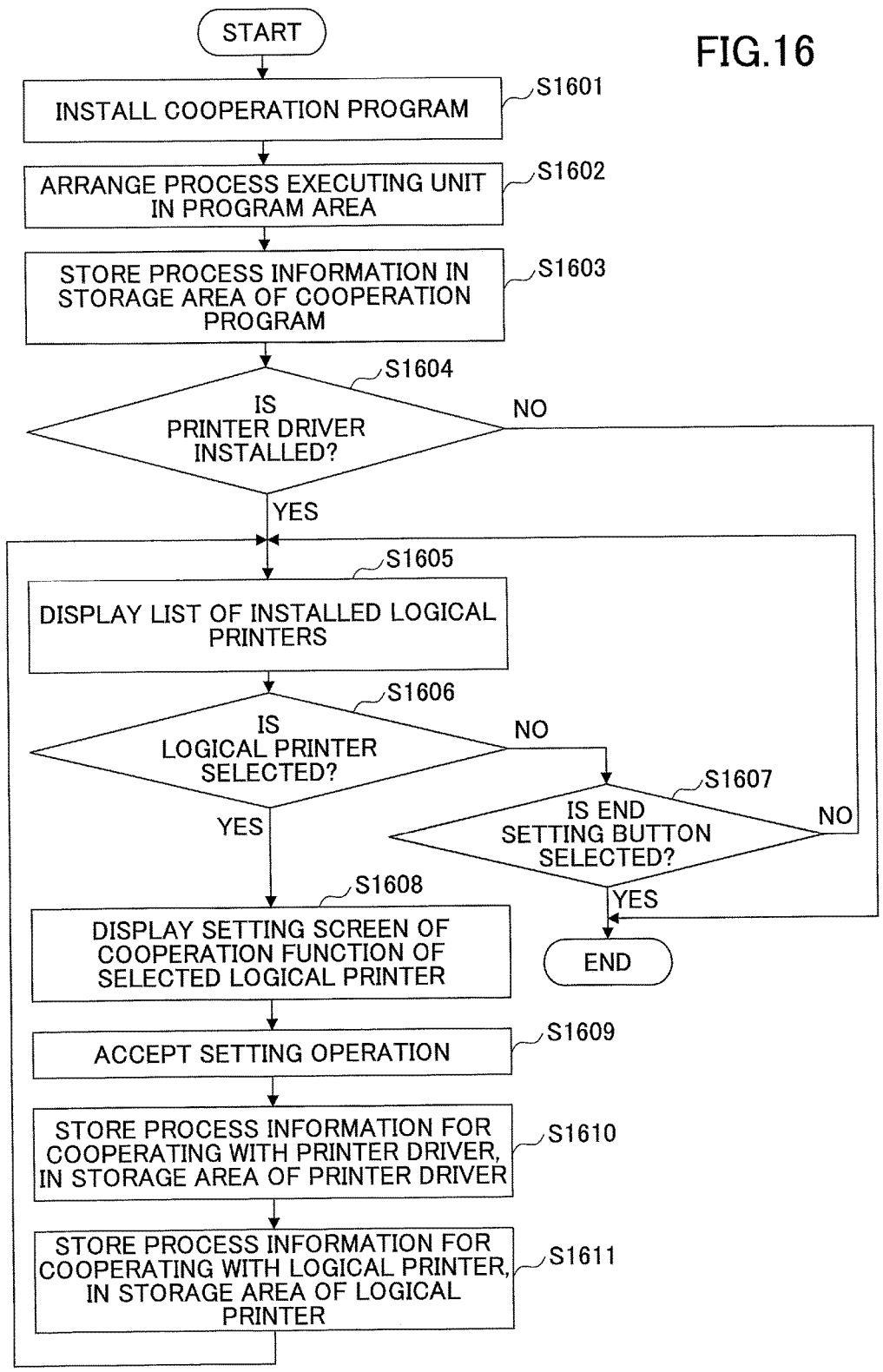
FIG. 16 is a flowchart illustrating an example of a process of installing a cooperation program according to the third embodiment of the present invention.

FIG. 16 is a flowchart illustrating an example of a process of installing a cooperation program according to the third embodiment. This process illustrates an example of a process executed by the installer 1520 and the cooperation program 604 when the installer 1520 installs the cooperation program 604 in the client device 10.

In step S1601, the installing unit 1521 of the installer 1520 installs the cooperation program 604 in the client device 10.

In step S1602, the arranging unit 722 of the cooperation program 604 arranges the process executing unit 605 in the program area 606. For example, the arranging unit 722 copies the plurality of process executing units 605-1 to 605-3 into the program area 606 (for example, a directory such as C:¥Program Files).

In step S1603, the process information managing unit 721 of the cooperation program 604 stores, in the storage area 1510 for the cooperation program (for example, the registry HKLM, etc.), the process information relating to the processes executed by the plurality of process executing units 605-1 to 605-3 arranged in the program area 606.

In step S1604, the cooperation function setting unit 1522 of the installer 1520 determines whether the printer driver 303 is installed in the client device 10.

When the printer driver 303 is not installed in the client device 10, the cooperation function setting unit 1522 ends the process. Conversely, when the printer driver 303 is installed in the client device 10, the cooperation function setting unit 1522 causes the process to proceed to step S1605.

In step S1605, the cooperation function setting unit 1522 of the installer 1520 causes the display device 102, etc., to display a list of logical printers (printer icons) as illustrated in FIG. 17A, for example.

FIG. 17A illustrates an image of an example of a display screen 1710 displaying a logical printer list 1711. On the display screen 1710, a list 1711 of logical printers installed in the client device 10 is displayed. The user moves a cursor 1712 to select one logical printer (for example, a logical printer B) from the logical printer list 1711 and selects a "select" button 1713, thereby selecting a logical printer for which a cooperation function is to be set. Furthermore, the user can end the setting of the cooperation function by selecting an "end setting" button 1714 on the display screen 1710.

In step S1606, the cooperation function setting unit 1522 of the installer 1520 determines whether a logical printer has been selected (whether a "select" button 1713 has been selected) on the display screen 1710 as illustrated in FIG. 17A, for example.

When the logical printer has not been selected, the cooperation function setting unit 1522 causes the process to proceed to step S1607. Conversely, when the logical printer has been selected, the cooperation function setting unit 1522 causes the process to proceed to step S1608.

In step S1607, the cooperation function setting unit 1522 of the installer 1520 determines whether the "end setting" button 1714 has been selected on the display screen 1710 as illustrated in FIG. 17A, for example.

When the "end setting" button 1714 has been selected, the cooperation function setting unit 1522 ends the process. Conversely, when the "end setting" button 1714 has not been selected, the cooperation function setting unit 1522 causes the process to return to step S1605, to continue the display of the logical printer list 1711.

Figure 17B:
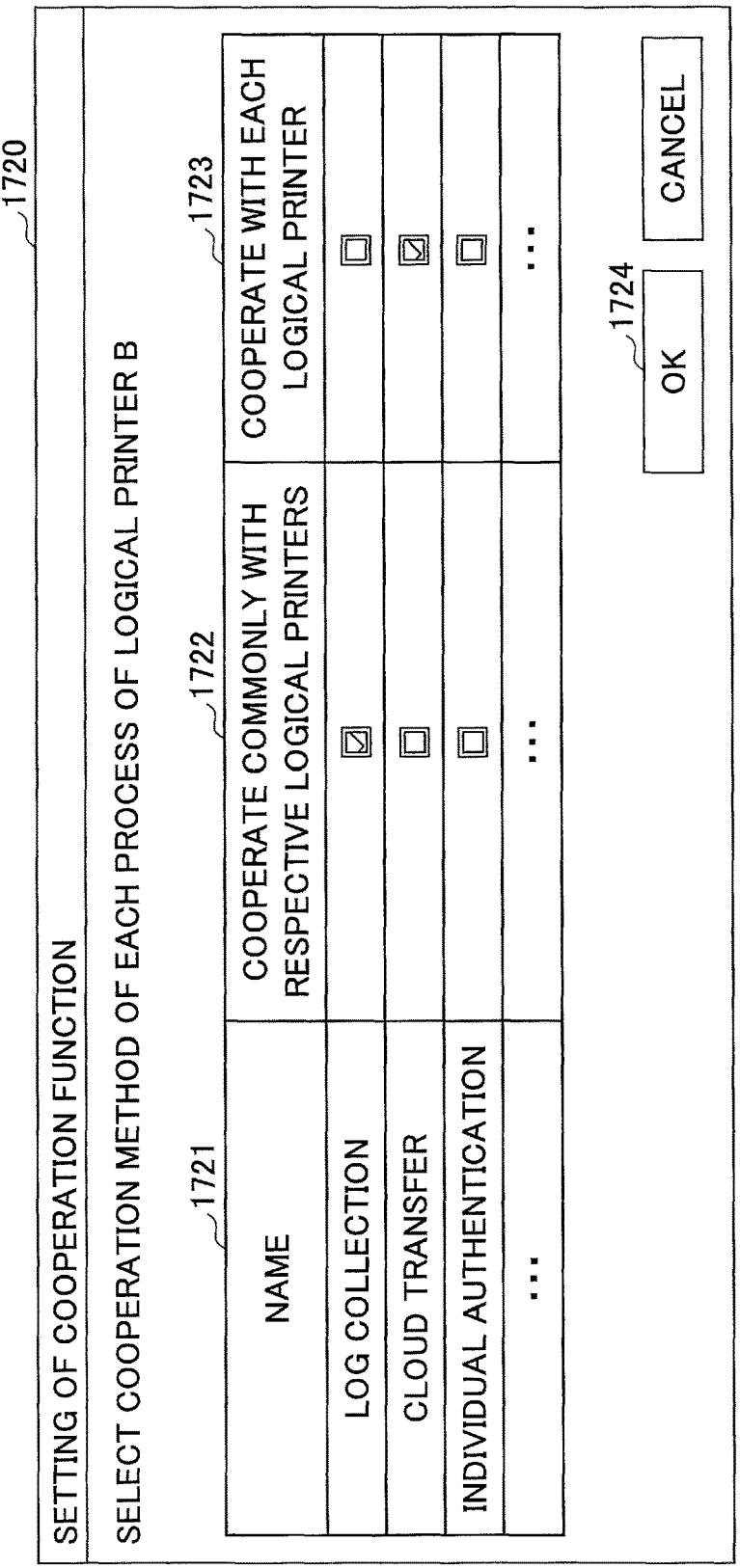

In step S1608, the cooperation function setting unit 1522 of the installer 1520 causes the display device 102, etc., to display a cooperation function setting screen 1720 as illustrated in FIG. 17B, for example.

FIG. 17B illustrates an image of an example of the cooperation function setting screen 1720. On the cooperation function setting screen 1720, a list of names 1721 of processes to be executed by a plurality of process executing units 605 of a logical printer (for example, the logical printer B) selected from the logical printer list 1711, is displayed. Furthermore, on the cooperation function setting screen 1720, a setting field 1722 for setting whether to cooperate commonly with the respective logical printers, and a setting field 1723 for setting whether to cooperate with each logical printer, are provided for each process.

In step S1609, the cooperation function setting unit 1522 of the installer 1520 accepts a setting operation on the cooperation function setting screen 1720 as illustrated in FIG. 17B, for example.

In step S1610, the process information managing unit 721 of the cooperation program 604 stores the process information of the process of cooperating with the printer driver 303, in the storage area 1301 for the printer driver. In the example of FIG. 17B, for the "log collection" process, a setting to cooperate commonly with the respective logical printers, is selected. In this case, the process information managing unit 721 stores the process information relating to the "log collection" process, in the storage area 1301 for the printer driver in FIG. 15.

In step S1611, the process information managing unit 721 of the cooperation program 604 stores the process information of a process of cooperating with the logical printer, in the storage area 751 for each logical printer. In the example of FIG. 17B, in the process of "cloud transfer", a setting to cooperate with each logical printer, is selected. In this case, the process information managing unit 721 stores process information relating to the "cloud transfer" process, in the storage area 751 for each logical printer.

Upon completion of the process of step S1611, the cooperation program 604 returns to step S1605 and executes the same process again.

Installation Process of Printer Driver—Third Embodiment

Figure 18:
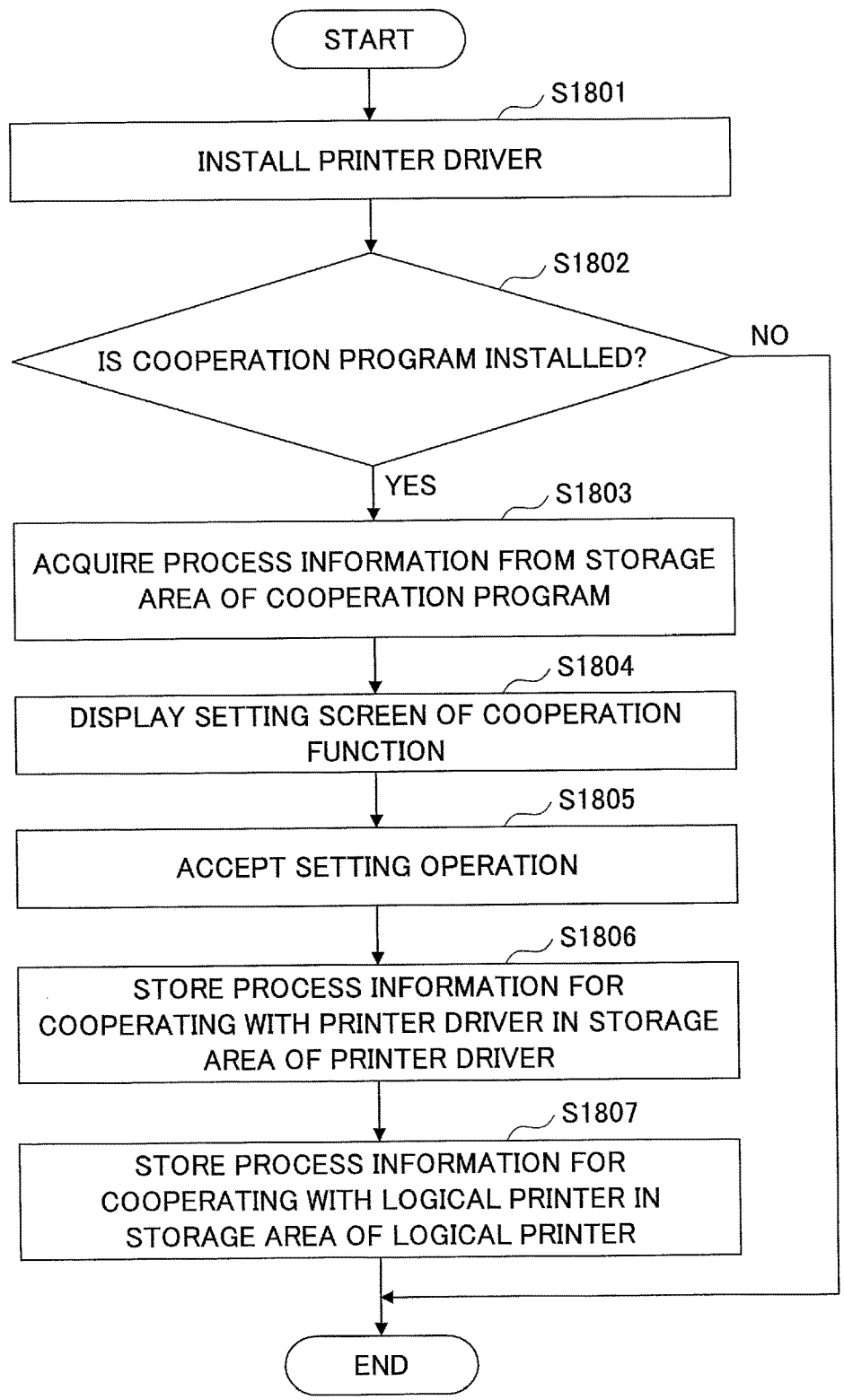
FIG. 18 is a flowchart illustrating an example of the installation process of the printer driver according to the third embodiment of the present invention.

FIG. 18 is a flowchart illustrating an example of the installation process of the printer driver according to the third embodiment. This process illustrates an example of a process executed by the installer 1520 and the cooperation program 604 when the installer 1520 installs the printer driver 303 in the client device 10.

In step S1801, the installing unit 1521 of the installer 1520 installs the printer driver 303 in the client device 10.

In step S1802, the cooperation function setting unit 1522 of the installer 1520 determines whether the cooperation program 604 is installed in the client device 10.

When the cooperation program 604 is not installed in the client device 10, the cooperation function setting unit 1522 ends the process. Conversely, when the cooperation program 604 is installed in the client device 10, the cooperation function setting unit 1522 causes the process to proceed to step S1803.

In step S1803, the cooperation function setting unit 1522 of the installer 1520 acquires the process information from the storage area 1510 for the cooperation program of FIG. 15. The process information includes, for example, the process information stored in step S1603 of FIG. 16.

In step S1804, the cooperation function setting unit 1522 of the installer 1520 causes the display device 102, etc., to display a setting screen as illustrated in FIG. 17B, for example.

In step S1805, the cooperation function setting unit 1522 of the installer 1520 accepts a setting operation on the setting screen as illustrated in FIG. 17B, for example.

In step S1806, the process information managing unit 721 of the cooperation program 604 stores the process information of the process of cooperating with the printer driver 303, in the storage area 1301 for the printer driver.

In step S1807, the process information managing unit 721 of the cooperation program 604 stores the process information of the process of cooperating with the logical printer, in the storage area 751 for each logical printer.

In this manner, the installer 1520 can install the cooperation program 604 in both the client device 10 in which the printer driver 303 is not installed, and the client device 10 in which the printer driver 303 is installed. Furthermore, the installer 1520 can install the printer driver 303 in both the client device 10 in which the cooperation program 604 is not installed, and the client device 10 in which the cooperation program 604 is installed. That is, according to the present embodiment, the lifecycle of the printer driver 303 and the lifecycle of the cooperation program 604 in the client device 10 do not have to match each other.

A lifecycle indicates the timing at which the program is installed in the client device 10, the timing at which the program is uninstalled from the client device 10, and the period during which the program is installed in the client device 10, etc. That is, according to the present embodiment, the timing at which the printer driver 303 is installed in or uninstalled from the client device 10, and the timing at which the cooperation program 604 is installed in or uninstalled from the client device 10, may be different timings.

By the above-described processes, a process for which a setting to cooperate commonly with the respective logical printers is selected in the cooperation function setting screen 1720 (first setting screen) as illustrated in FIG. 17B, is commonly executed in the respective logical printers in the printer driver 303.

Furthermore, with respect a process for which a setting to cooperate with each logical printer is selected in the cooperation function setting screen 1720 (first setting screen) as illustrated in FIG. 17B, it is possible to select whether to cooperate for each logical printer, in the extended function selection screen 1020 (second setting screen) as illustrated in FIG. 10B.

Note that the cooperation function setting unit 1522 is an example of a first cooperation function setting unit that displays the first setting screen. The cooperation function setting unit 741 is an example of a second cooperation function setting unit that displays the second setting screen.

Fourth Embodiment

In a fourth embodiment, an example will be described in which the client device 10 includes a determining unit that determines the execution order of processes executed by the plurality of process executing unit 605.

Functional Configuration—Fourth Embodiment

Figure 19:
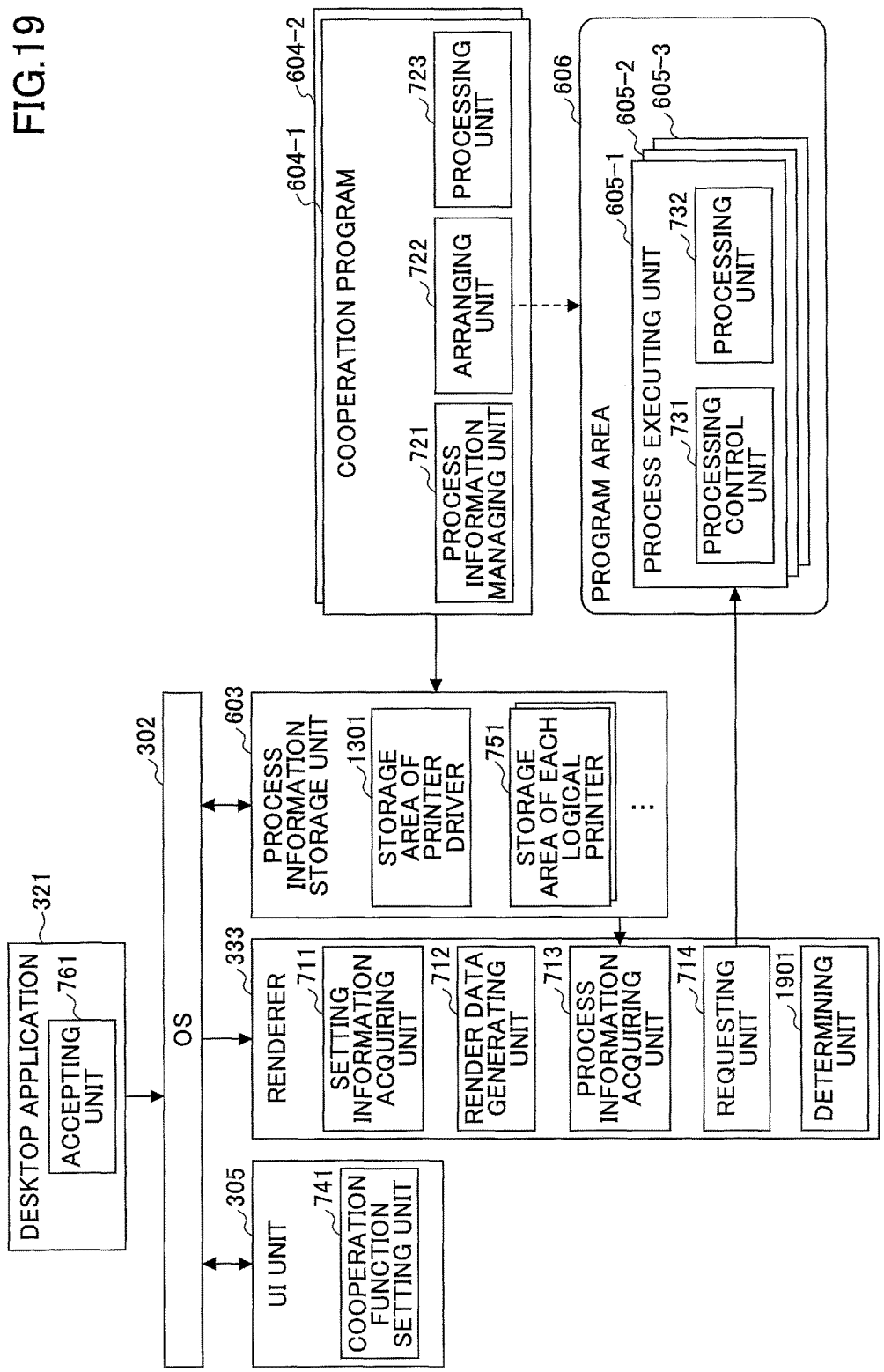
FIG. 19 is a functional block diagram of an example of the renderer, the UI unit, and the cooperation program according to a fourth embodiment of the present invention.

FIG. 19 is a functional block diagram of an example of the renderer 333, the UI unit 305, and the cooperation program 604 according to the fourth embodiment.

The process information storage unit 603 illustrated in FIG. 19 includes the storage area 1301 for the printer driver and the storage area 751 for each logical printer. Among these storage areas, the storage area 1301 for the printer driver corresponds to the storage area 1301 for the printer driver according to the second embodiment illustrated in FIG. 13. The storage area 751 for each logical printer corresponds to the storage area 751a for the logical printer A, the storage area 751b for the logical printer B, . . . , according to the second embodiment illustrated in FIG. 13.

In addition to the functional configuration of the renderer 333 according to the second embodiment illustrated in FIG. 13, the renderer 333 illustrated in FIG. 19 includes a determining unit 1901.

In the first to third embodiments, for example, the process information stored in the process information storage unit 603 is a single piece of process information as illustrated in FIGS. 8A to 8C, or the process information stored in the process information storage unit 603 are pieces of process information for which the execution order is determined in advance as illustrated in FIGS. 9A and 9B. However, the process information storage unit 603 may store a plurality of pieces of process information whose execution order is not determined in advance.

The determining unit 1901 determines the execution order of processes executed by the plurality of process executing units 605 based on the plurality of pieces of process information stored in the process information storage unit 603. For example, the determining unit 1901 determines the execution order of processes executed by the plurality of process executing units 605 according to the execution order and the execution method information as indicated in Table 2.

TABLE 2

| PROCESS TYPE | EXECUTION ORDER | EXECUTION METHOD |
|---|---|---|
| MODIFY | BEFORE READING AND TRANSFERRING | SERIAL |
| READ | BEFORE TRANSFERRING, AFTER MODIFYING | PARALLEL OR SERIAL |
| TRANSFER | AFTER MODIFYING AND READING | PARALLEL OR SERIAL |

In the example of Table 2, the execution order is defined such that the modifying process executed before the reading process and the transferring process. This is because, in the reading process, it is necessary to read the information after executing the modifying process, and in the transferring process, it is necessary to transfer the print data after executing the modifying process. Furthermore, the execution method is defined such that the modifying processes are to be executed in series, that is, it is defined that the plurality of processes are to be sequentially executed. This is because in order to apply all of the modifications to the print data, it is necessary to sequentially execute the processes with respect to the print data.

Furthermore, in the example of Table 2, the execution order is defined such that the reading process is executed before the transferring process and after the modifying process. This is because in the reading process, the information after executing the modifying process needs to be read, and there is a possibility that the printing data will be deleted when the transferring process is performed. Furthermore, the execution method is defined such that the reading processes can be executed in parallel or in series, that is, it is possible to execute a plurality of processes in parallel. This is because the print data is not modified in the reading process, and therefore there is no problem even if multiple pieces of information are read in parallel.

Furthermore, in the example of Table 2, the execution order is defined such that the transferring process is executed after the modifying process and the reading process. This is because, in the transferring process, it is necessary to transfer the print data that has been modified and read. Furthermore, the execution method is defined such that the transferring processes can be executed in parallel or in series, that is, it is possible to execute a plurality of processes in parallel. This is because the content of the print data is not modified in the transferring process, and therefore there is no problem even if the print data is transmitted in parallel to a plurality of transfer destinations.

Furthermore, as illustrated in FIG. 19, the client device 10 can execute a plurality of cooperation programs 604-1 and 604-2.

Functional configurations other than those described above are the same as the functional configurations according to the second embodiment illustrated in FIG. 13.

Process Flow—Fourth Embodiment

Printing Process—Fourth Embodiment

Figure 20:
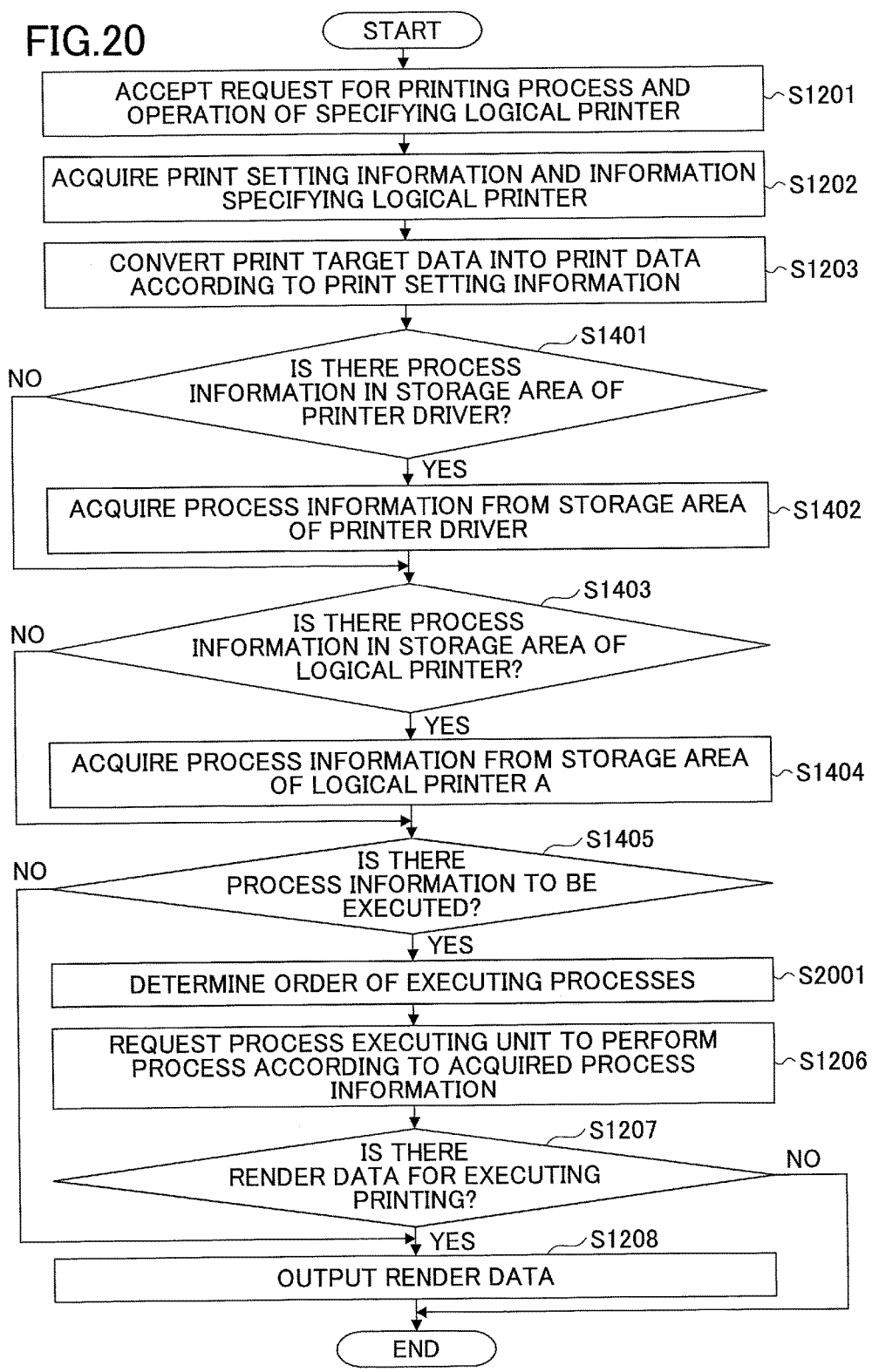
FIG. 20 is a flowchart illustrating an example of the printing process according to the fourth embodiment of the present invention.

FIG. 20 is a flowchart illustrating an example of the printing process according to the fourth embodiment. Note that the processes of steps S1201 to S1203 and the processes of steps S1206 to S1208 of FIG. 20 are the same as those of the printing process according to the first embodiment illustrated in FIG. 12. Furthermore, the processes of steps S1401 to S1405 in FIG. 20 are the same as those of the printing process according to the second embodiment illustrated in FIG. Here, differences from the first embodiment and the second embodiment will be mainly described.

In step S1405 of FIG. 20, when it is determined that there is process information to be executed, in step S2001, the determining unit 1901 of the renderer 333 determines the execution order of processes based on the acquired process information.

Process of Determining Execution Order—Fourth Embodiment

Figure 21:
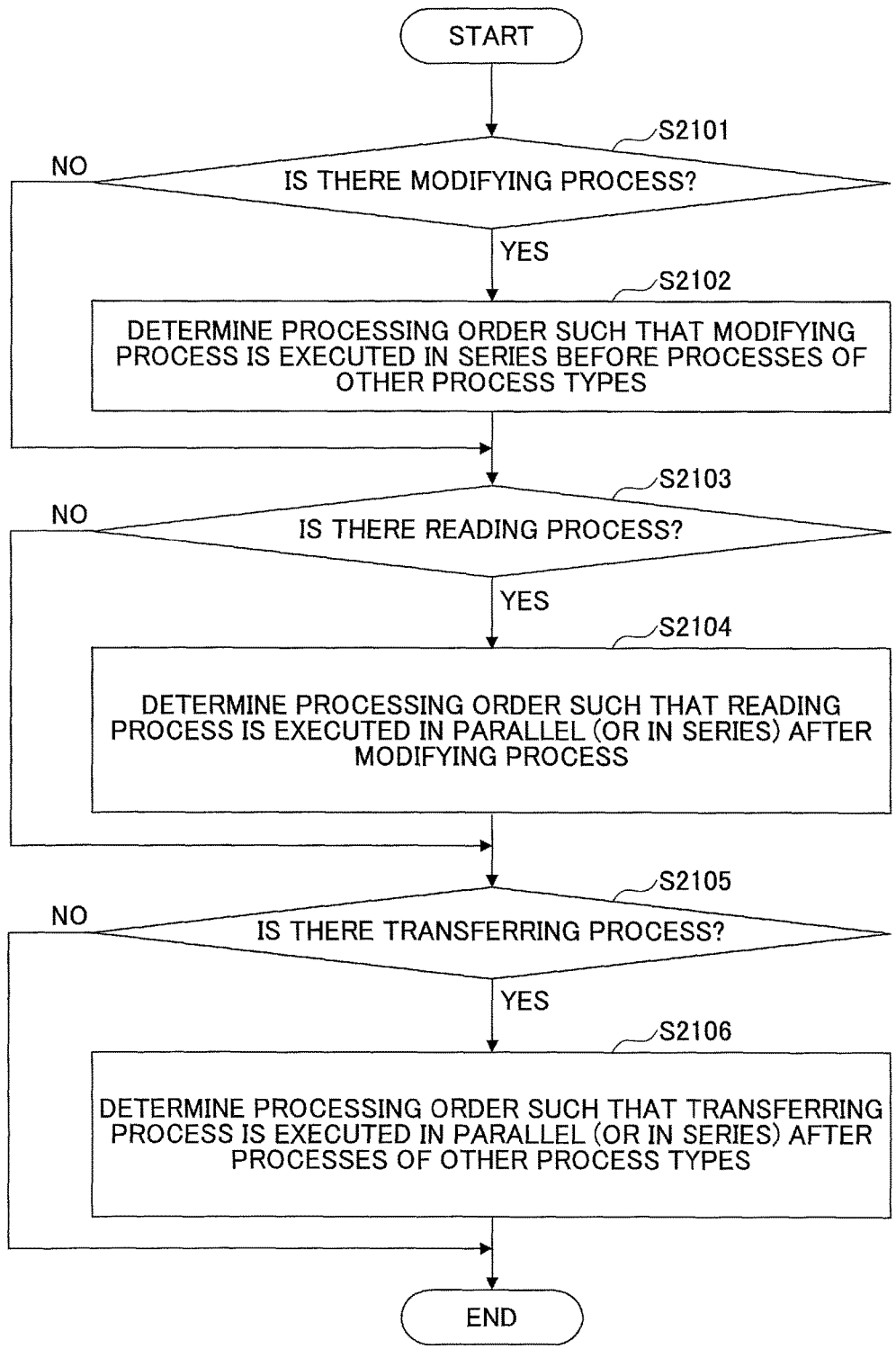
FIG. 21 is a flowchart of an example of an execution order determination process according to the fourth embodiment of the present invention.

FIG. 21 is a flowchart of an example of an execution order determination process according to the fourth embodiment. This process indicates an example of the process of determining the execution order of the processes executed in step S2001 of FIG. 20.

In step S2101, the determining unit 1901 of the renderer 333 determines whether there is a modifying process in the process information acquired by the process information acquiring unit 713 in steps S1401 to S1404 of FIG. 20. For example, as illustrated in FIG. 8A, the determining unit 1901 determines whether there is the process information 810 of a modifying process including the character string "modify" in the information 813 indicating the process type.

Note that the process information acquired by the process information acquiring unit 713 includes process information acquired from the storage area 1301 for the printer driver in step S1402 and process information acquired from the storage area 751 of each logical printer presently selected in step S1404.

In step S1402, the process information acquiring unit 713 acquires the process information from the storage area 1301 for the printer driver.

In step S1403, the process information acquiring unit 713 of the renderer 333 determines whether there is process information in the storage area (for example, the storage area 751a for the logical printer A) corresponding to the specified logical printer, included in the process information storage unit 603.

When there is no process information in the storage area corresponding to the specified logical printer, the process information acquiring unit 713 causes the process to proceed to step S1405. Conversely, when there is process information in the storage area corresponding to the specified logical printer, the process information acquiring unit 713 causes the process to proceed to step S1404.

In step S1404, the process information acquiring unit 713 acquires the process information from the storage area corresponding to the specified logical printer.

When there is no modifying process, the determining unit 1901 causes the process to proceed to step S2103. Conversely, when there is a modifying process, the determining unit 1901 causes the process to proceed to step S2102.

In step S2102, the determining unit 1901 determines the execution order so as to execute the modifying process included in the process information acquired by the process information acquiring unit 713, before the other process types (reading process and transferring process). Furthermore, when there are a plurality of modifying processes, the determining unit 1901 determines the execution order of the plurality of modifying processes so as to execute the plurality of modifying processes serially (sequentially). Note that, for example, the execution order of the plurality of modifying processes is determined according to the order acquired by the process information acquiring unit 713.

In step S2103, the determining unit 1901 of the renderer 333 determines whether there is a reading process in the process information acquired by the process information acquiring unit 713. For example, as illustrated in FIG. 8B, the determining unit 1901 determines whether there is the process information 820 of the reading process including the character string "read" in the information indicating the process type.

When there is no reading process, the determining unit 1901 causes the process to proceed to step S2105. Conversely, when there is a reading process, the determining unit 1901 causes the process to proceed to step S2104.

In step S2104, the determining unit 1901 determines the execution order of the processes such that the reading process included in the process information acquired by the process information acquiring unit 713 is executed after the modifying process. Furthermore, when there are a plurality of reading processes, the determining unit 1901 determines the execution order of the plurality of reading processes so as to execute the plurality of reading processes in parallel or in series.

Preferably, when there are a plurality of reading processes, the determining unit 1901 determines the execution order of the plurality of reading processes such that the plurality of reading processes are executed in parallel.

In step S2105, the determining unit 1901 of the renderer 333 determines whether there is a transferring process in the process information acquired by the process information acquiring unit 713. For example, as illustrated in FIG. 8C, the determining unit 1901 determines whether the process information 830 of the transferring process including the character string "transfer", is included in the information indicating the process type.

When there is no transferring process, the determining unit 1901 ends the process. Conversely, when there is a transferring process, the determining unit 1901 causes the process to proceed to step S2106.

In step S2106, the determining unit 1901 determines the execution order of the processes such that the transferring process included in the process information acquired by the process information acquiring unit 713 is executed after the processes of other process types (modifying process and reading process). Furthermore, when there are a plurality of transferring processes, the determining unit 1901 determines the execution order of the plurality of transferring processes so as to execute the plurality of transferring processes in parallel or in series.

Preferably, when there are a plurality of transferring processes, the determining unit 1901 determines the execution order of the plurality of transferring processes so as to execute the plurality of transferring processes in parallel.

By the above processes, the execution order of the processes executed by the plurality of process executing units 605 is determined.

Another Example—Fourth Embodiment

Figure 22:
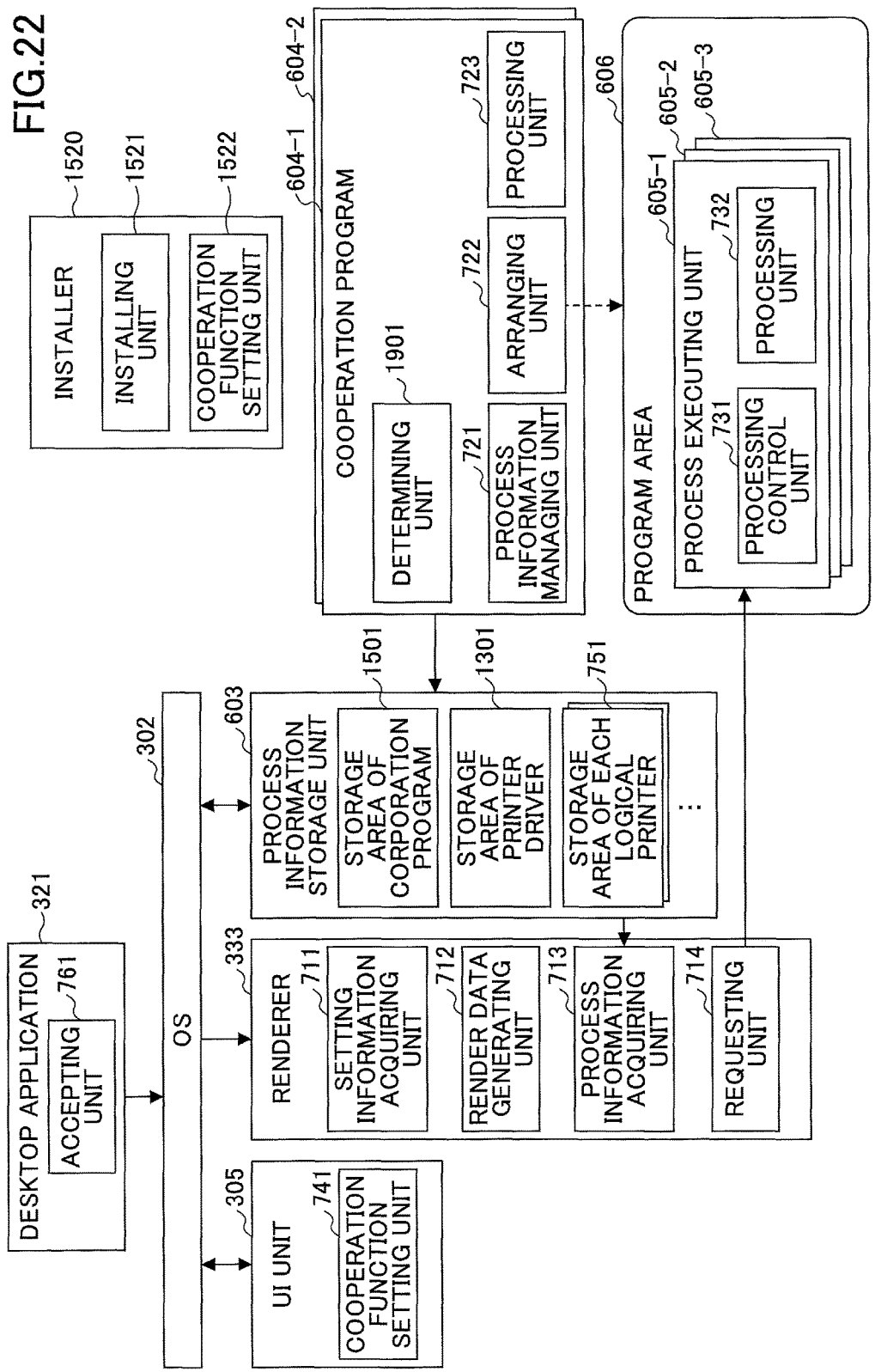
FIG. 22 is a functional block diagram of another example of the renderer, the UI unit, and the cooperation program according to the fourth embodiment of the present invention.

FIG. 22 is a functional block diagram of another example of the renderer 333, the UI unit 305, and the cooperation program 604 according to the fourth embodiment. The functional configuration illustrated in FIG. 22 corresponds to the functional configuration according to the third embodiment illustrated in FIG. 15; however, the determining unit 1901 is included in the cooperation program 604.

Furthermore, as illustrated in FIG. 22, the client device 10 can execute a plurality of cooperation programs 604-1 and 604-2.

In FIG. 22, for example, when the process information managing unit 721 stores process information in the process information storage unit 603 in steps S1607 and S1608 of FIG. 16, the determining unit 1901 of the cooperation program 604 executes a process of determining the execution order, as illustrated in FIG. 21.

Furthermore, for example, when the process information managing unit 721 stores the process information in the process information storage unit 603 in steps S1806 and S1807 in FIG. 18, the determining unit 1901 of the cooperation program 604 executes a process of determining the execution order, as illustrated in FIG. 21.

Note that, for example, when the installer 1520 installs the cooperation program 604-2 in the client device 10, there may be cases where the cooperation program 604-1 has already been installed in the client device 10. In such a case, the determining unit 1901 combines the process information of the cooperation program 604-1 stored in the process information storage unit 603 and the process information of the cooperation program 604-2, and executes a process of determining the execution order, as illustrated in FIG. 21.

Example of Usage Scene—Fourth Embodiment

Figure 23:
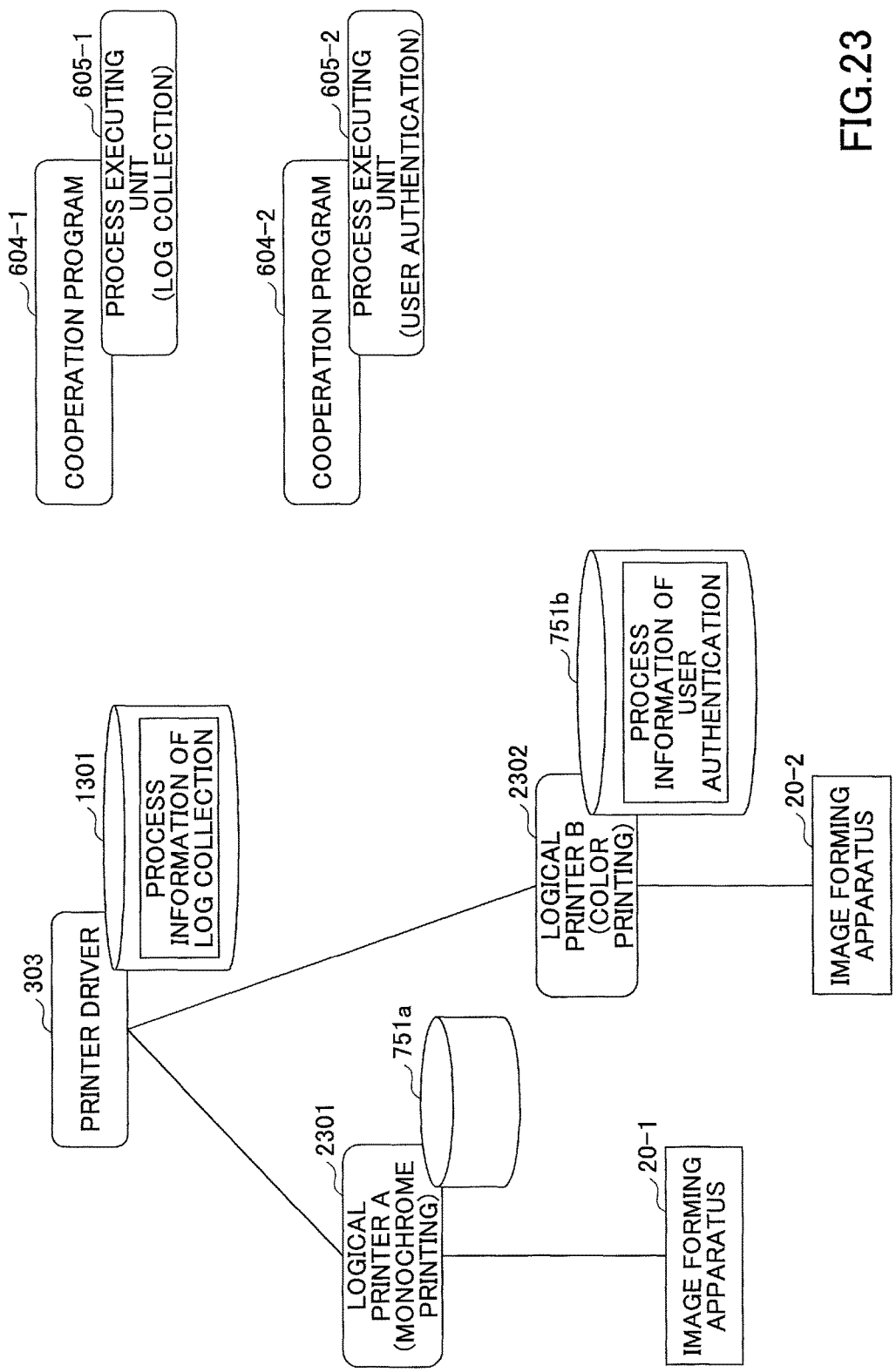
FIG. 23 is a diagram for describing an example of a usage scene according to the fourth embodiment of the present invention.

FIG. 23 is a diagram for describing an example of a usage scene according to an embodiment. In FIG. 23, it is assumed that two image forming apparatuses 20-1 and 20-2 are coupled to the client device 10.

A logical printer A 2301 is assumed to be a logical printer for performing monochrome printing by the image forming apparatus 20-1 using the printer driver 303. Furthermore, a logical printer B 2302 is assumed to be a logical printer for performing color printing by the image forming apparatus 20-3 using the printer driver 303.

The cooperation program 604-1 is a program for collecting logs in cooperation with the printer driver 303, and the process executing unit 605-1 for executing log collection is arranged in the program area of the client device 10. Furthermore, the cooperation program 604-2 is a program for performing user authentication in cooperation with the printer driver 303, and the process executing unit 605-2 for executing user authentication is arranged in the program area of the client device 10.

In the above configuration, when all the logical printers of the printer driver 303 are to collect logs, the user (or administrator) of the client device 10 stores process information 2311 of log collection that is process information of the process executing unit 605-1, in the storage area 1301 for the printer driver. For example, the user uses the cooperation function setting screen 1720 as illustrated in FIG. 17B to select "setting field 1723 for setting whether to cooperate commonly with respective logical printers". Accordingly, the user can perform log collection with all of the logical printers of the printer driver 303 without making settings for each logical printer.

Furthermore, when the user of the client device 10 desires to decide whether color printing can be performed by performing authentication, the user stores process information 2312 for user authentication, which is process information of the process executing unit 605-2, in the storage area 751b of the logical printer B. For example, the user selects a check box 1022 corresponding to "individual authentication" on the extended function selection screen 1020 as illustrated in FIG. 10B. Accordingly, when performing color printing using the logical printer B 2302, the user can selectively perform an authentication process.

Fifth Embodiment

According to the first to fourth embodiments, it is possible to easily add an individual extended function to the printer driver 303, which is the V4 printer driver, while maintaining the convenience of the user. At this time, there is a problem of how to set the extended function added to the printer driver 303.

For example, in the V3 printer driver, as described above, an individual extension function is implemented by using a vendor's individual port monitor. In this case, for example, the user can make settings for the individual extended function by using a port monitor setting screen 2400 as illustrated in FIG. 24, for example.

However, the port monitor setting screen 2400 is for setting a function that has been incorporated in the port monitor in advance. For example, there is a problem that other extended functions introduced at different timings cannot be set.

Therefore, in a fifth embodiment, an example of a preferable method of setting an extension function added to the printer driver 303, will be described.

Functional Configuration—Fifth Embodiment

Functional Configuration of Client Device—Fifth Embodiment

Figure 25:
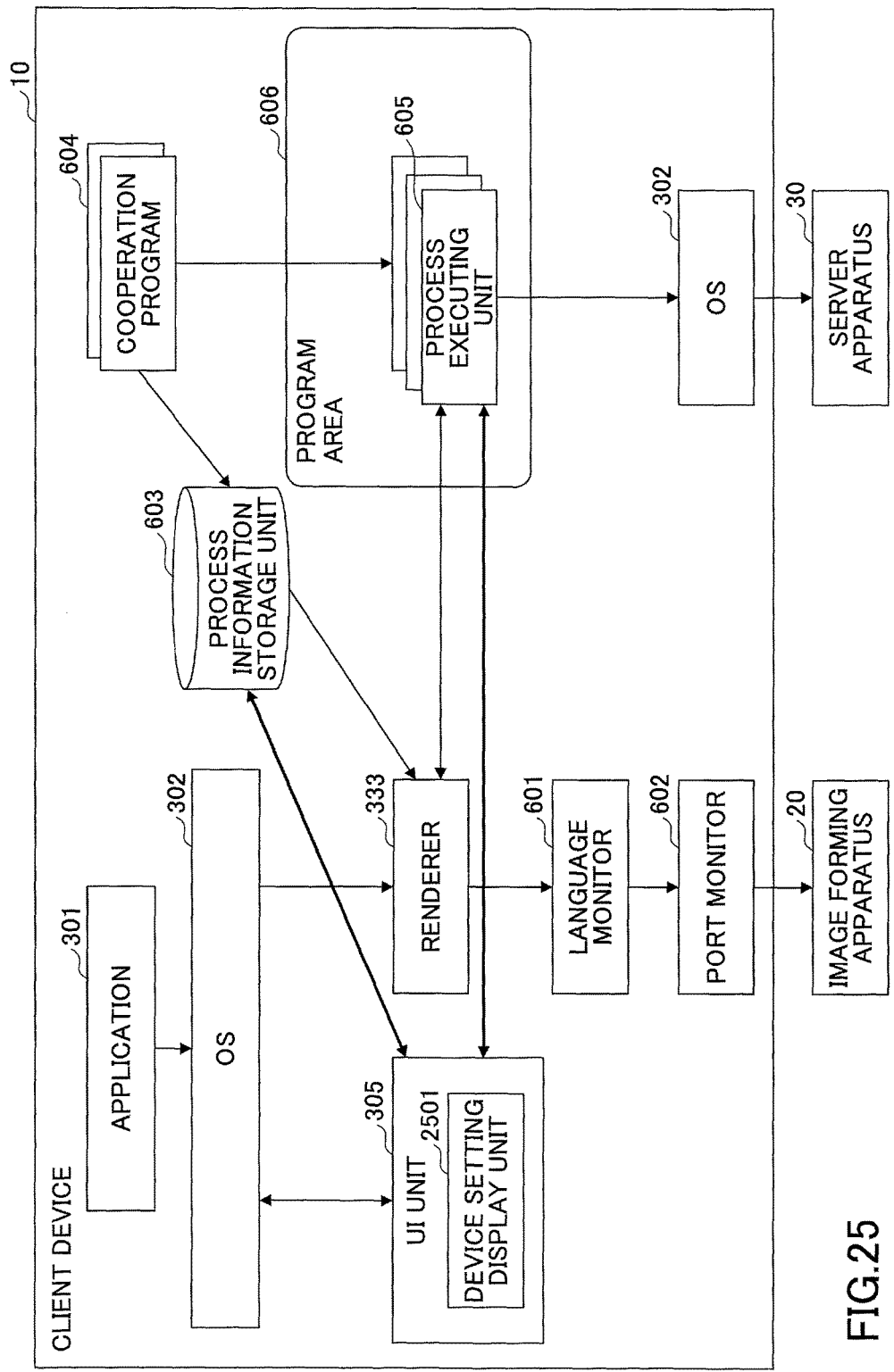
FIG. 25 is a functional block diagram of the client device according to the fifth embodiment of the present invention.

FIG. 25 is a functional block diagram of the client device according to the fifth embodiment. The UI unit 305 of the client device 10 according to the present embodiment includes a device setting display unit 2501 for displaying the setting screen of the extended function executed by the process executing unit 605 based on the process information stored in the process information storage unit 603.

Figure 26:
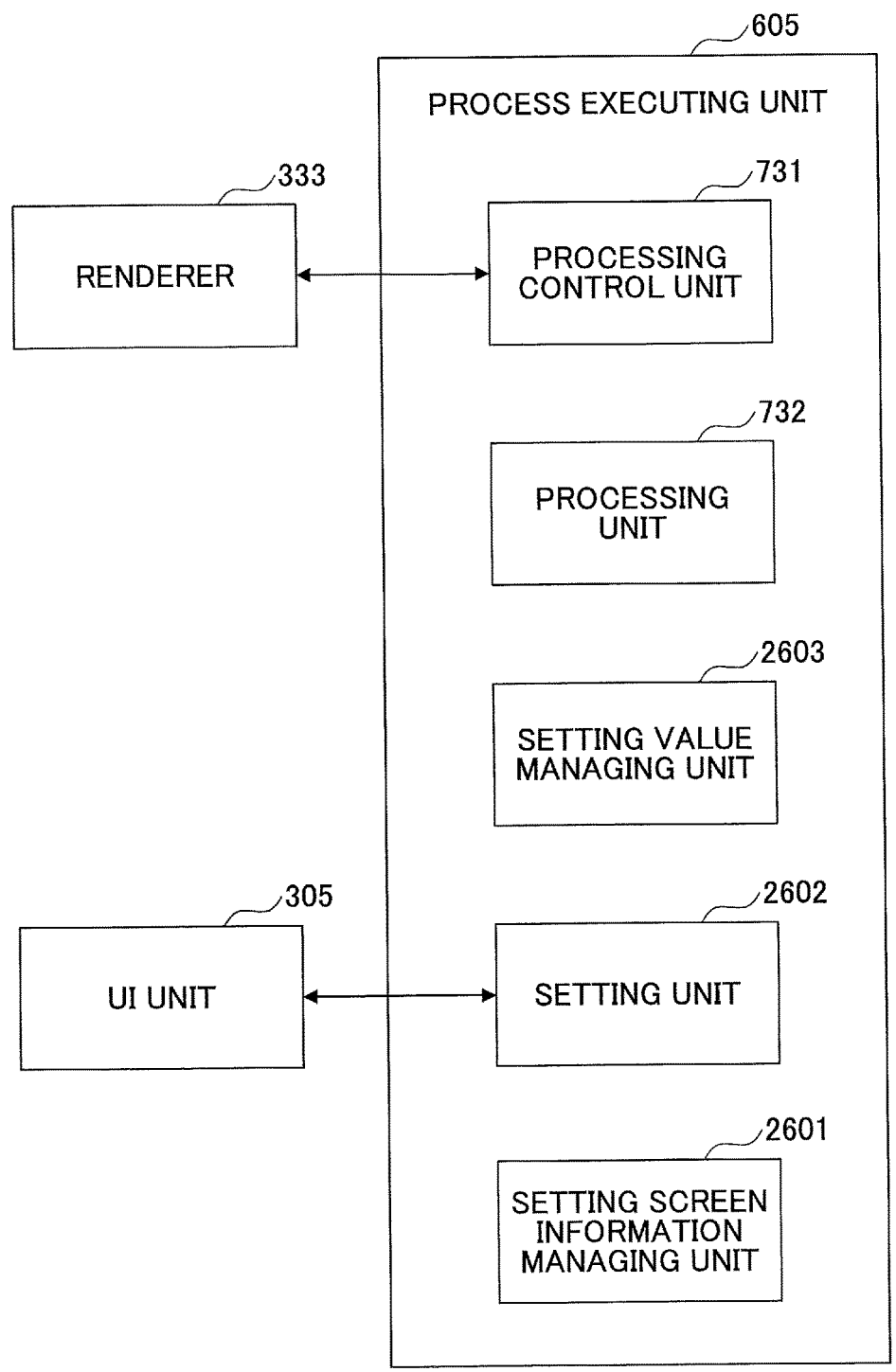
FIG. 26 is a functional block diagram of an example of the process executing unit according to the fifth embodiment of the present invention.

FIG. 26 is a functional block diagram of an example of the process executing unit 605 according to the fifth embodiment. The process executing unit 605 according to the present embodiment includes a setting screen information managing unit 2601, a setting unit 2602, and a setting value managing unit 2603, etc., in addition to the process control unit 731 and the processing unit 732.

The setting screen information managing unit 2601 stores and manages information (hereinafter referred to as "setting screen information") for displaying the setting screen of the extended function executed by the process executing unit 605 in a predetermined storage area (for example, a file and a registry, etc.).

The setting screen information includes information used for constructing an extended function setting screen and information defining a process for an operation on the setting screen, etc., used by the device setting display unit 2501. For example, the setting screen information includes arrangement information of operation buttons, operation event handlers, icons, term information, and help information, etc.

The setting value managing unit 2603 stores and manages the setting value of the extended function executed by the process executing unit 605 in a predetermined storage area (for example, a file and a registry, etc.). Furthermore, the processing unit 732 according to the present embodiment executes the extended function executed by the process executing unit 605 according to the setting value managed by the setting value managing unit 2603.

With the above configuration, the setting unit 2602 provides the setting screen information to be managed by the setting screen information managing unit 2601, to the device setting display unit 2501, in response to a request from the device setting display unit 2501 of the UI unit 305. Furthermore, the setting unit 2602 accepts an event report that is reported from the device setting display unit 2501 (for example, an operation report by the user, etc.), and changes the setting value managing unit 2603 according to the accepted operation content.

On the other hand, the device setting display unit 2501 of the UI unit 305 illustrated in FIG. 25 uses the process information stored in the process information storage unit 603 to identify one or more process executing units 605 stored in the program area 606, and acquires setting screen information from the identified process executing unit 605. Furthermore, the device setting display unit 2501 uses the acquired setting screen information to display a setting screen (a setting screen of an extended function) for setting an extended function executed by one or more process executing units 605.

Upon accepting an operation with respect the process executing unit 605 on the displayed setting screen, the device setting display unit 2501 sends, to the process executing unit 605, an event report indicating the accepted operation content. Furthermore, upon accepting an operation (such as an end operation, etc.) with respect to the UI unit 305 on the displayed setting screen, the device setting display unit 2501 executes a corresponding process in the device setting display unit 2501.

Note that the functional configurations of the client device 10 according to the fifth embodiment illustrated in FIG. 24 other than the above are the same as those of the client device 10 according to the embodiment illustrated in FIG. 6, for example.

Process Flow—Fifth Embodiment

Next, the flow of a process of the information processing method according to the fifth embodiment will be described.

Display Process of Device Setting Screen—Fifth Embodiment

Figure 27:
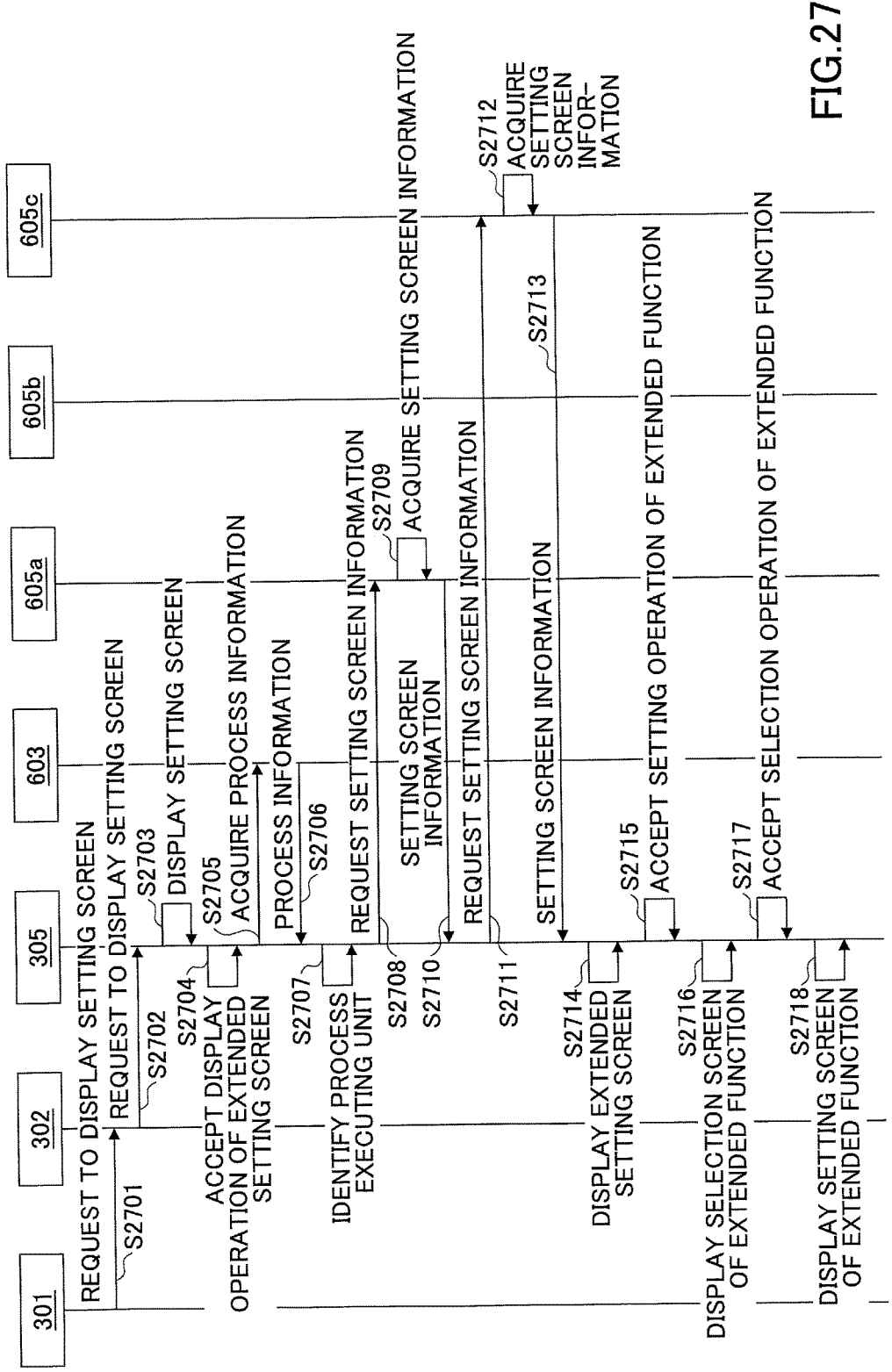
FIG. 27 is a sequence diagram illustrating an example of a display process of the device setting screen according to the fifth embodiment of the present invention.

FIG. 27 is a sequence diagram illustrating an example of a display process of the device setting screen according to the fifth embodiment. This process indicates an example of a process for displaying the setting screen of the extended function executed by the process executing unit 605 based on the process information stored in the process information storage unit 603 by the device setting display unit 2501 of the UI unit 305.

Note that at the starting point of the process illustrated in FIG. 27, it is assumed that the process executing units 605a to 605c are stored in the program area 606 of the client device 10, and process information of the process executing units 605a to 605c is stored in the process information storage unit 603.

In step S2701, the application 301 sends, to the OS 302, a report indicating a request to display a device setting screen, for example, in response to a user's operation, etc.

In step S2702, the OS 302 sends, to the UI unit 305, the report indicating the request to display the setting screen received from the application 301. Note that when the application 301 is the desktop application 321, the UI unit 305 is the extension configurator 313 of the printer driver 303; and when the application 301 is the store application 311, the UI unit 305 is the store device application 304.

In step S2703, for example, the UI unit 305 displays a device setting screen 2810 as illustrated in FIG. 28A, on the display device 102, etc., of the client device 10. The device setting screen 2810 according to the present embodiment includes an "extended setting of device" button 2811 for accepting an operation to display the extended setting screen. The user can perform the display operation for the extended setting screen by selecting the "extended setting of device" button 2811 included in the device setting screen 2810.

In step S2704, when the UI unit 305 accepts a display operation for the extension setting screen on the device setting screen 2810, the device setting display unit 2501 of the UI unit 305 executes the processes of step S2705 and onward.

Figure 28B:
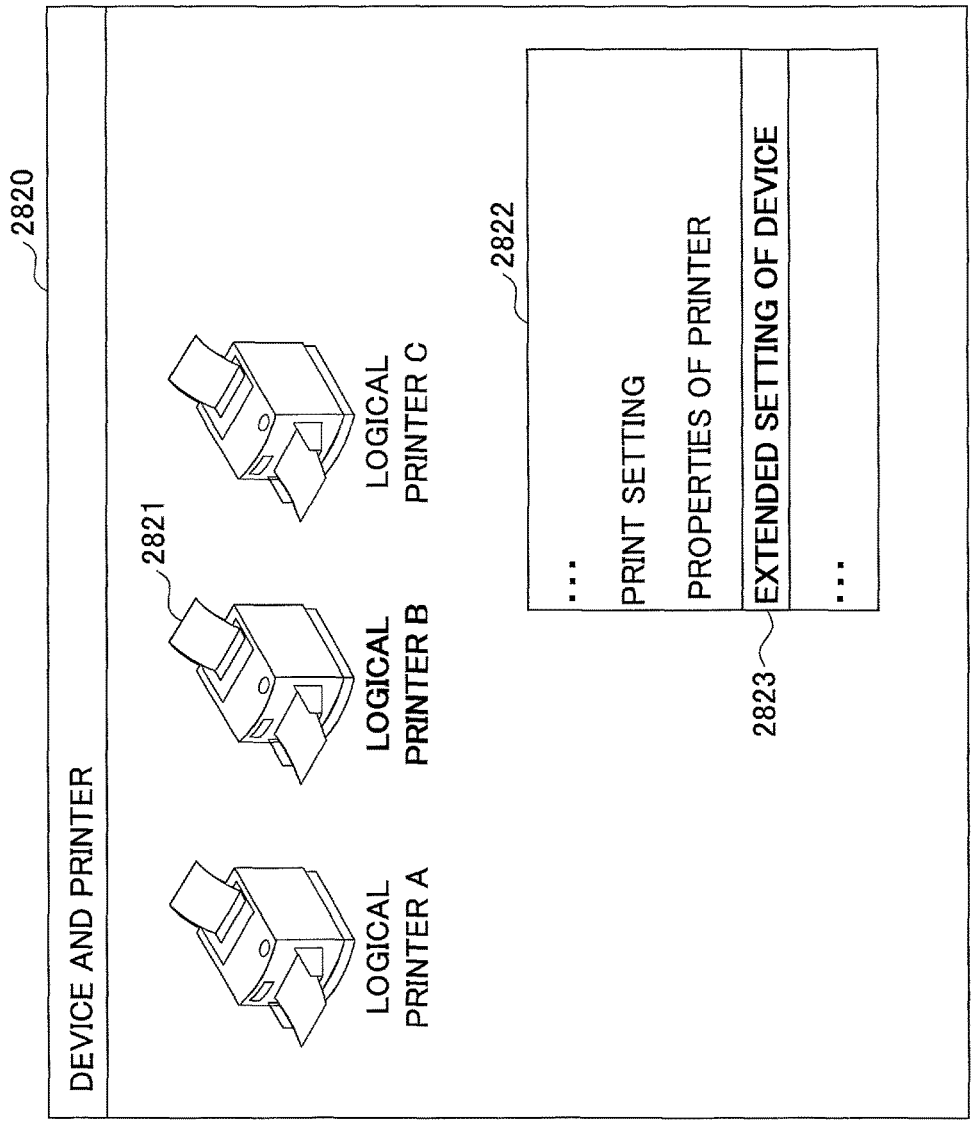

Note that the processes of steps S2701 to S2704 are examples of processes for accepting the display operation for the extended setting screen. As another example, the user can also perform a display operation for the extended setting screen from a device of the control panel of the OS 302 and a printer screen 2820, etc., as illustrated in FIG. 28B.

For example, by the shell extension function of the OS 302, an item 2823 of "extended setting of device" is added to a menu 2822 displayed when a logical printer (printer icon) 2821 is right-clicked. The user may perform the display operation of the extended setting screen by selecting the item 2823 of "extended setting of device".

In steps S2705 and S2706, the device setting display unit 2501 of the UI unit 305 acquires the process information stored in the process information storage unit 603. The process information includes, for example, information (path information) 812 indicating a path in which the process executing unit 605 is stored, as the process information 810 illustrated in FIG. 8A.

Preferably, the processing information stored in the process information storage unit 603 includes information indicating whether the process executing unit 605 has an extended function setting screen.

Note that the extended functions executed by the process executing unit 605 include an extended function having a setting screen of the extended function and an extended function not having a setting screen of the extended function. Table 3 indicates an example of the extended function having the extended function setting screen.

TABLE 3

| EXTENDED FUNCTION | EXAMPLES OF SPECIFIC PROCESSES |
|---|---|
| PRINT DATA ANALYSIS | CHARGE PREDICTION PRINT PREVIEW ETC. |
| PRINT DATA MODIFICATION | ADDING AUTHENTICATION INFORMATION COLOR → GREY SCALE CONVERSION PDF CONVERSION ETC. |
| PRINT DATA TRANSFER | TRANSFER PRINT DATA TO EXTERNAL SERVER ETC. |

Among the examples of the extended function "print data analysis" indicated in Table 3, processes such as charge prediction and print preview, etc., can be performed by displaying a setting screen of an extended function such as dialogue, and accepting input of a setting value or a confirmation operation, etc., by the user.

For example, in the charge prediction process, dialogs for displaying setting states such as double-sided, aggregate, and color, etc., and the costs required for printing, etc., are displayed on the display device 102, the user is prompted to determine the validity of the setting values, and changes to the setting values are accepted according to need.

Furthermore, among the examples of the extended function "print data modification" indicated in Table 3, processes such as adding authentication information, color→grey scale conversion, and Portable Document Format (PDF) conversion, etc., can be performed by displaying a setting screen of an extended function such as a dialog, and accepting input of a setting value or a confirmation operation, etc., by the user.

For example, in the process of adding authentication information, a dialog displaying an authentication information input field and a check box for setting whether to add authentication information, etc., is displayed on the display device 102, and the user is prompted to make a setting, and an input setting value can be accepted.

Furthermore, among the examples of the extended function "print data transfer" indicated in Table 3, processes such as transferring print data to an external server can be performed by displaying a setting screen of an extended function such as a dialog, and accepting input of a setting value or a confirmation operation, etc., by the user.

For example, in a process such as transferring print data to an external server, a dialog for displaying the server information (server name and Internet Protocol (IP) address, etc.) of the transfer destination, etc., is displayed on the display device 102, and input of a setting value or a confirmation operation, etc., by the user can be accepted.

In step S2707, the device setting display unit 2501 of the UI unit 305 identifies the process executing unit 605 stored in the program area 606, by using the acquired process information.

Preferably, the device setting display unit 2501 identifies the process executing unit 605 having the extended function setting screen, among the process executing units 605a to 605c stored in the program area 606, by using the acquired process information.

In steps S2708 to S2713, the device setting display unit 2501 of the UI unit 305 acquires setting screen information for displaying the setting screen of the extended function to be executed by the process executing unit 605, from the process executing units 605a to 605c.

Preferably, the device setting display unit 2501 of the UI unit 305 acquires the setting screen information from the process executing unit 605 having the extended function setting screen among the process executing units 605a to 605c stored in the program area 606. Here, as an example, it is assumed in the following descriptions that the process executing units 605a and 605c have an extended function setting screen, and the process executing unit 605b does not have an extended function setting screen.

In step S2708, the device setting display unit 2501 of the UI unit 305 requests the process executing unit 605a to acquire the setting screen information.

In step S2709, upon accepting the request for the setting screen information, the setting unit 2602 of the process executing unit 605a acquires the setting screen information managed by the setting screen information managing unit 2601.

In step S2710, the setting unit 2602 of the process executing unit 605a transmits the acquired setting screen information to the UI unit 305.

Similarly, in step S2711, the device setting display unit 2501 of the UI unit 305 requests the process executing unit 605c to acquire the setting screen information.

In step S2712, upon accepting the request for the setting screen information, the setting unit 2602 of the process executing unit 605c acquires the setting screen information managed by the setting screen information managing unit 2601.

In step S2713, the setting unit 2602 of the process executing unit 605c transmits the acquired setting screen information to the UI unit 305.

Figure 29:
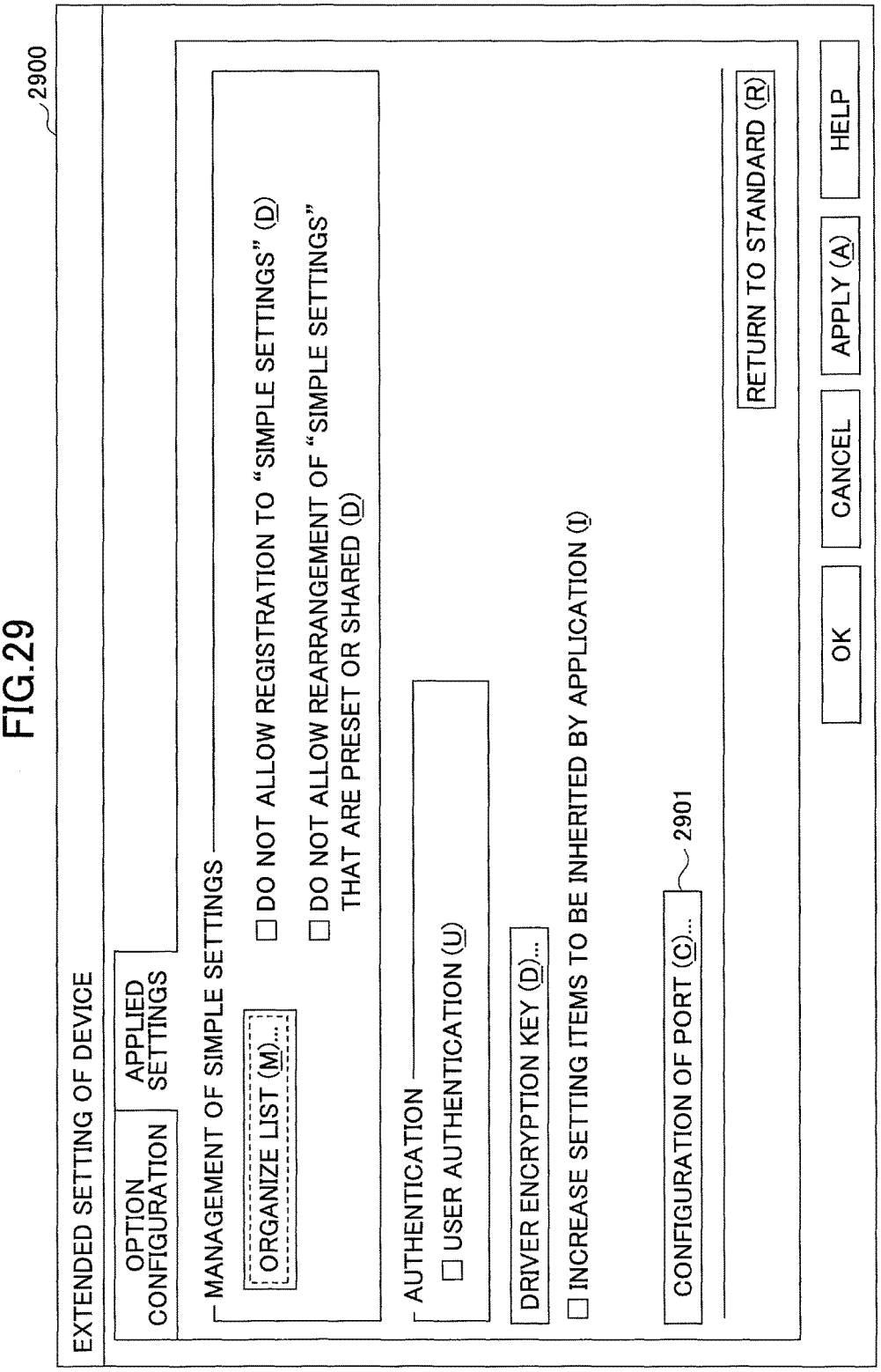
FIG. 29 is a diagram illustrating an example of a display screen (2) according to the fifth embodiment of the present invention.

In step S2714, the device setting display unit 2501 of the UI unit 305 causes the display device 102, etc., to display, for example, an extended setting of device screen 2900 as illustrated in FIG. 29. On the extended setting of device screen 2900 according to the present embodiment, there are buttons for setting extended functions executed by the process executing unit 605 stored in the program area 608, for example, a button for "configuration of port" 2901 in FIG. 29. The user can perform the setting operation of the extended function by selecting the "configuration of port" button 2901 in the extended setting of device screen 2900 illustrated in FIG. 29, for example.

In step S2715, upon accepting an operation for setting the extended function, the device setting display unit 2501 of the UI unit 305 executes the processes of steps S2716 and onward.

In step S2716, the device setting display unit 2501 of the UI unit 305 causes the display device 102, etc., to display an extended function selection screen 3000 as illustrated in FIG. 30A, for example.

In the example of FIG. 30A, items such as "name", "description", and "to cooperate", etc., are displayed on the extended function selection screen 3000. "Name" is information indicating the name, etc., of the process executing units 605a to 605c stored in the program area 608. "Description" is information intended for the user, indicating the outline of the extended function executed by the process executing units 605a to 605c. "To cooperate" includes a check box 3001 for setting whether to use the extended function executed by the process executing units 605a to 605c, and setting buttons 3002 and 3003 for setting the extended functions, etc.

On the extended function selection screen 3000 illustrated in FIG. 30A, the user can use the corresponding extended function by, for example, setting the check box 3001 to a selected state. The information set here is stored, for example, in the QueuePropertyBag 420, etc., which is a storage area corresponding to the logical printer.

Furthermore, the user can display a data monitoring function setting screen 3010 as illustrated in FIG. 30B, for example, by selecting the setting button 3002 corresponding to the extended function "monitor data". Furthermore, the user can display a cloud transfer function setting screen 3020 as illustrated in FIG. 30C, for example, by selecting the setting button 3003 corresponding to the extended function "cloud transfer".

Note that the device setting display unit 2501 of the UI unit 305 may omit the displaying of the extended function selection screen 3000, when there is one process executing unit 605 having an extended function setting screen, and may display a setting screen of the extended function on the display device 102, etc.

In step S2717, the device setting display unit 2501 of the UI unit 305 accepts an operation of selecting an extended function by the user on the extended function selection screen 3000 as illustrated in FIG. 30A, for example.

In step S2718, the device setting display unit 2501 of the UI unit 305 displays the setting screen of the selected extended function on the display device 102, etc.

By the above processes, the UI unit 305 can display setting screens of one or more extended functions added to the printer driver 303, so that the setting operations by the user can be accepted.

Extended Function Setting Process—Fifth Embodiment

FIG. 31 is a sequence diagram illustrating an example of an extended function setting process according to the fifth embodiment. Note that, at the starting point of the process illustrated in FIG. 31, it is assumed that the setting screen of the extended function corresponding to the process executing unit 605a, for example, the data monitoring function setting screen 3010 illustrated in FIG. 30B, is displayed on the display device 102, etc., by the process of displaying the device setting screen illustrated in FIG. 26.

In step S3101, the device setting display unit 2501 of the UI unit 305 accepts, for example, a user's setting operation on the data monitoring function setting screen 3010.

In step S3102, the device setting display unit 2501 of the UI unit 305 identifies the operation target of the accepted operation. For example, the device setting display unit 2501 identifies whether the accepted operation is an operation of setting the data monitoring function executed by the process executing unit 605a or an operation with respect to the UI unit 305 (for example, the setting end operation, etc.).

Since the setting operation with respect to the data monitoring function setting screen 3010 is being performed in step S3101, the device setting display unit 2501 determines that the accepted operation is an operation of setting the data monitoring function, and executes the process of step S3103.

In step S3103, the device setting display unit 2501 of the UI unit 305 sends, to the process executing unit 605a, an event report including the accepted operation content.

For example, the device setting display unit 2501 sends, to the process executing unit 605a, an event report including the port name and IP address input in the data monitoring function setting screen 3010 illustrated in FIG. 30B.

In step S3104, the setting unit 2602 of the process executing unit 605a accepts the operation content included in the event report, and in step S3105, the setting unit 2602 reports, to the UI unit 305, a response message indicating that the event report has been accepted.

Similarly, the user may display a setting screen of an extended function corresponding to the process executing unit 605c, for example, the cloud transfer function setting screen 3020 illustrated in FIG. 30C, and may set setting values such as the transfer server name and the transfer server address, etc.

In step S3106, the device setting display unit 2501 of the UI unit 305 accepts, for example, a setting ending operation by the user.

In step S3107, the device setting display unit 2501 of the UI unit 305 identifies the operation target of the accepted operation. Here, since the setting end operation has been performed in step S3106, the device setting display unit 2501 determines that the operation is an operation with respect to the UI unit 305, and executes the processes of steps S3108 and onward.

In step S3108, the device setting display unit 2501 of the UI unit 305 transmits an end report indicating that setting process has ended, to the process executing unit 605a.

In step S3109, upon accepting the end report, the setting unit 2602 of the process executing unit 605a applies (stores), for example, the setting value corresponding to the operation content accepted in step S3104, etc., to the setting value managed by the setting value managing unit 2603. For example, the setting unit 2602 applies information such as a port name and an IP address, etc., included in the event report accepted in step S3104, to the setting value managed by the setting value managing unit 2603.

In step S3110, the setting unit 2602 of the process executing unit 605a transmits a response message indicating that the setting process has ended, to the UI unit 305.

Similarly, in step S3111, the device setting display unit 2501 of the UI unit 305 transmits an end report indicating that the setting process has ended, to the process executing unit 605c.

In step S3112, upon accepting the end report, the setting unit 2602 of the process executing unit 605c applies (stores) the setting value corresponding to the accepted operation content, to the setting value managed by the setting value managing unit 2603.

In step S3113, the setting unit 2602 of the process executing unit 605c transmits a response message indicating that setting process has ended, to the UI unit 305.

By the above processes, the UI unit 305 can display the setting screen of one or more extended functions added to the printer driver 303, and apply the setting contents input by the user to the process executed by the process executing unit 605.

Printing Process—Fifth Embodiment

FIG. 32 is a sequence diagram illustrating an example of a printing process according to the fifth embodiment. This process indicates an example of the a printing process when the process executing unit 605 executes the extended function by using a setting value set in the process of setting the extended function illustrated in FIG. 31.

Note that at the starting point of the printing process illustrated in FIG. 32, for example, it is assumed that cooperation between the extended function to be executed by the process executing unit 605a and the extended function to be executed by the process executing unit 605c, is set as effective in the extended function selection screen 3000 as illustrated in FIG. 30A. Furthermore, it is assumed that cooperation with the extended function executed by the process executing unit 605b is set as ineffective.

In step S3201, the application 301 requests the OS 302 to perform a printing process in response to, for example, a printing operation, etc., by the user.

In step S3202, the OS 302 reports, to the renderer 333 of the printer driver 303, a print instruction in response to a request for a printing process from the application 301.

In step S3203, the render data generating unit 712 of the renderer 333 generates print data according to the print instruction from the OS 302.

In steps S3204 and S3205, the process information acquiring unit 713 of the renderer 333 acquires process information from the process information storage unit 603.

In step S3206, the requesting unit 714 of the renderer 333 identifies the process executing unit 605 that is to execute the extended function. For example, the requesting unit 714 identifies the process executing unit 605 that is to execute the extended function, based on the information stored in the QueuePropertyBag 420, etc., by the extended function selection screen 3000 as illustrated in FIG. 30A, for example. Here, the following description will be given of an example of executing the extended function executed by the process executing unit 605a and the extended function executed by the process executing unit 605c.

In step S3207, the requesting unit 714 of the renderer 333 requests the process executing unit 605a to perform a predetermined process (for example, a data monitoring function) on the print data.

In step S3208, the processing unit 732 of the process executing unit 605a acquires setting contents (setting values) managed by the setting value managing unit 2603.

In step S3209, the processing unit 732 of the process executing unit 605a executes a predetermined process according to the acquired setting contents, and in step S3210, the processing unit 732 transmits a completion report indicating that the process has been completed, to the renderer 333.

Similarly, in step S3211, the requesting unit 714 of the renderer 333 requests the process executing unit 605c to perform a predetermined process (for example, a cloud transfer function) on the print data.

In step S3212, the processing unit 732 of the process executing unit 605c acquires setting contents (setting values) managed by the setting value managing unit 2603.

In step S3213, the processing unit 732 of the process executing unit 605c executes a predetermined process according to the acquired setting contents, and in step S3214, the processing unit 732 transmits a completion report indicating that the process has been completed, to the renderer 333.

By the above processes, the client device 10 can execute a printing process in which the process executing unit 605 executes the extended function, using, for example, the setting value set in the extended function setting process illustrated in FIG. 31.

Note that the present embodiment can be implemented in combination with the first to fourth embodiments. For example, the printing process according to the first to fourth embodiments can be applied to the printing process illustrated in FIG. 32.

As described above, according to the embodiments of the present invention, in a V4 printer driver or the printer driver 303 having a similar restriction as the V4 printer driver, an individual extended function can be easily added to the printer driver 303 while maintaining the convenience of the user.

The information processing apparatus, the information processing system, and the information processing method are not limited to the specific embodiments described in the detailed description, and variations and modifications may be made without departing from the spirit and scope of the present invention.

What is claimed is:

1. An information processing apparatus for executing a printer driver that requests an image processing apparatus to perform image processing, the information processing apparatus comprising a processor, in communication with a memory, executing a process including:
   executing, by a plurality of process executors, a predetermined process in response to a request from the printer driver, the predetermined process corresponding to at least one extended function to be executed on print data;
   storing, in a predetermined storage area, process information that is information relating to the plurality of process executors;
   accepting a request for a printing process to print the print data, the request being accepted via a user interface displayed on a display device;
   acquiring, by the printer driver, the process information from the predetermined storage area, upon accepting the request for the printing process; and
   requesting, by the printer driver, at least one of the plurality of process executors to execute the predetermined process on the print data, based on the acquired process information, wherein
   the storing includes storing the process information relating to the predetermined process requested by the printer driver, among processes executable by the plurality of process executors, in at least one storage area corresponding to each logical printer in the printer driver,
   the accepting includes accepting a specification of at least one of the logical printers relating to the printing process, together with the request for the printing process, and
   the acquiring includes acquiring the process information from the at least one storage area corresponding to the at least one of the logical printers that has been specified.

2. The information processing apparatus according to claim 1, wherein the storing includes storing, in a storage area corresponding to the printer driver, the process information relating to a process to be requested commonly to the logical printers in the printer driver, among the processes executable by the plurality of process executors.

3. The information processing apparatus according to claim 2, wherein the acquiring includes acquiring the process information from the storage area corresponding to the printer driver, upon determining that the process information is stored in the storage area corresponding to the printer driver.

4. The information processing apparatus according to claim 2, wherein the processor further executes the process including:
   executing a cooperation program configured to cooperate with the printer driver;
   arranging, by the cooperation program, the plurality of process executors in a storage area executable from the printer driver; and
   storing, by the cooperation program, the process information relating to the processes executable by the arranged plurality of process executors, in the at least one storage area corresponding to each of the logical printers or in the storage area corresponding to the printer driver.

5. The information processing apparatus according to claim 4, wherein the storing includes storing, in a storage area corresponding to the cooperation program, the process information relating to the processes executable by the plurality of process executors.

6. The information processing apparatus according to claim 5, wherein the processor further executes the process including:
   displaying a first setting screen to be used for determining whether to store the process information in the at least one storage area corresponding to each of the logical printers, or to store the process information in the storage area corresponding to the printer driver, based on the process information stored in the storage area corresponding to the cooperation program.

7. The information processing apparatus according to claim 6, wherein the displaying includes displaying the first setting screen in response to the cooperation program being installed in the information processing apparatus.

8. The information processing apparatus according to claim 6, wherein the displaying includes displaying the first setting screen in response to the printer driver being installed in the information processing apparatus.

9. The information processing apparatus according to claim 1, wherein the processor further executes the process including:
   displaying a second setting screen to be used for setting a process for which execution is requested by the at least one of the logical printers, among one or more processes corresponding to the process information, based on the process information stored in the at least one storage area corresponding to the at least one of the logical printers.

10. The information processing apparatus according to claim 1, wherein the process information includes path information used for accessing the at least one of the plurality of process executors corresponding to the process information.

11. The information processing apparatus according to claim 1, wherein the process information includes information indicating a type of a process corresponding to the process information.

12. The information processing apparatus according to claim 11, wherein the processor further executes the process including:
   determining an execution order of processes to be executed by the plurality of process executors, based on the type of the process.

13. The information processing apparatus according to claim 12, wherein the requesting includes requesting the at least one of the plurality of process executors to execute the processes according to the determined execution order.

14. The information processing apparatus according to claim 1, wherein the processor further executes the process including:
   acquiring information relating to a setting screen for the predetermined process from the at least one of the plurality of process executors, based on the process information stored in the predetermined storage area; and displaying the setting screen for the predetermined process by using the acquired information.

15. The information processing apparatus according to claim 14, wherein the processor further executes the process including:

storing the information relating to the setting screen for the predetermined process;

acquiring a setting value set by using the setting screen for the predetermined process;

storing the acquired setting value; and executing the predetermined process according to the stored setting value.

16. An information processing system comprising:

an image processing apparatus including a first processor configured to execute image processing; and an information processing apparatus including a second processor configured to execute a printer driver that requests the image processing apparatus to execute the image processing, wherein the second processor is configured to, in communication with a memory, execute a process including:

executing, by a plurality of process executors, a process in response to a request from the printer driver, the process corresponding to at least one extended function to be executed on print data;

storing, in at least one storage area corresponding to each logical printer in the printer driver, process information relating to the process requested by the printer driver among processes executable by the plurality of process executors;

accepting a specification of at least one of the logical printers relating to a printing process, together with a request for the printing process to print the print data, the specification and the request being accepted via a user interface displayed on a display device;

acquiring, by the printer driver, the process information from the at least one storage area corresponding to the at least one of the logical printers that has been specified; and requesting, by the printer driver, at least one of the plurality of process executors to execute the process on the print data, based on the acquired process information.

17. An information processing method, executed by a computer, in an information processing apparatus configured to execute a printer driver that requests an image processing apparatus to execute image processing, the information processing method comprising:

storing a plurality of process executors configured to execute a process in response to a request from the printer driver, the process corresponding to at least one extended function to be executed on print data;

storing, in at least one storage area corresponding to each logical printer in the printer driver, process information relating to the process requested by the printer driver among processes executable by the plurality of process executors;

accepting a specification of at least one of the logical printers relating to a printing process, together with a request for the printing process to print the print data, the specification and the request being accepted via a user interface displayed on a display device;

acquiring the process information from the at least one storage area corresponding to the at least one of the logical printers that has been specified; and requesting at least one of the plurality of process executors to execute the process on the print data, based on the acquired process information.

* * * * *